United States Patent
Wilson et al.

(10) Patent No.: US 9,796,231 B2
(45) Date of Patent: Oct. 24, 2017

(54) ENERGY STORING SUSPENSION COMPONENTS HAVING RETENTION RECESSES

(71) Applicant: Hendrickson USA, L.L.C., Itasca, IL (US)

(72) Inventors: William Wilson, Downers Grove, IL (US); William Darcy Robertson, Thamesford (CA); Ashley Thomas Dudding, Yorkville, IL (US); Quang C. Nguyen, Willow Springs, IL (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 0 days.

(21) Appl. No.: 15/203,500

(22) Filed: Jul. 6, 2016

(65) Prior Publication Data

US 2016/0311283 A1    Oct. 27, 2016

Related U.S. Application Data

(62) Division of application No. 14/605,021, filed on Jan. 26, 2015, now Pat. No. 9,415,654, which is a division
(Continued)

(51) Int. Cl.
*B60G 13/00* (2006.01)
*B60G 11/113* (2006.01)
(Continued)

(52) U.S. Cl.
CPC ............ *B60G 11/113* (2013.01); *B60G 11/04* (2013.01); *B60G 11/465* (2013.01);
(Continued)

(58) Field of Classification Search
CPC ............ B60G 13/005; B60G 2202/112; B60G 2202/13; B60G 2202/132;
(Continued)

(56) References Cited

U.S. PATENT DOCUMENTS

| 379,839 A | 3/1888 | White |
|---|---|---|
| 1,294,338 A | 2/1919 | Hawkins |

(Continued)

FOREIGN PATENT DOCUMENTS

| DE | 297 13 996 U1 | 12/1998 | |
|---|---|---|---|
| DE | 29713996 U1 * | 12/1998 | ............... B60G 9/02 |

(Continued)

OTHER PUBLICATIONS

Trenkamp & Gehle, Vorrichtung zur Verbindung des Achskörpers einer Radachse, insbesondere eines Nutzfahrzeugs, mit den Längslenkern einer Achsabstützung, Dec. 10, 1998, German Patent Office, DE 297 13 996 U1, Machine Translation of Description.*

(Continued)

*Primary Examiner* — James A English
(74) *Attorney, Agent, or Firm* — Cook Alex Ltd.

(57) ABSTRACT

Energy storing suspension components for use in suspension systems for wheeled vehicles and trailers, and suspension systems incorporating such energy storing suspension components are disclosed. The energy storing suspension components include an axle seat portion, a first end, and a first limb extending between the axle seat portion and the first end. The axle seat portion includes first and second surfaces with at least one of the first and second surfaces having at least two spaced apart recesses that are spaced from a center of the axle seat portion, the recesses being configured to receive respective protrusions extending from at least one suspension component that is connected to the energy storing suspension component when coupled within an axle coupling assembly.

18 Claims, 24 Drawing Sheets

Related U.S. Application Data of application No. 13/801,312, filed on Mar. 13, 2013, now Pat. No. 9,050,870.

(60) Provisional application No. 61/653,223, filed on May 30, 2012.

(51) Int. Cl.
  *B60G 11/46* (2006.01)
  *F16F 1/26* (2006.01)
  *B60G 11/04* (2006.01)

(52) U.S. Cl.
  CPC ............ *B60G 13/005* (2013.01); *F16F 1/26* (2013.01); *B60G 2202/112* (2013.01); *B60G 2204/121* (2013.01); *B60G 2204/129* (2013.01); *B60G 2204/43* (2013.01); *B60G 2204/4306* (2013.01); *B60G 2204/44* (2013.01); *B60G 2206/428* (2013.01); *B60G 2800/80* (2013.01)

(58) Field of Classification Search
  CPC ........ B60G 2206/428; B60G 2204/121; B60G 11/34; B60G 11/46; B60G 11/465; B60G 11/10; B60G 3/16; F16F 1/26
  See application file for complete search history.

(56) References Cited

U.S. PATENT DOCUMENTS

| | | | |
|---|---|---|---|
| 1,330,923 A | 2/1920 | Utz | |
| 1,379,798 A | 5/1921 | Burgess | |
| 1,530,729 A | 3/1925 | Laher | |
| 1,829,163 A | 10/1931 | Sprong | |
| 2,587,522 A * | 2/1952 | Pilkington, Jr. | F16F 1/182 267/52 |
| 3,195,876 A | 7/1965 | Tea | |
| 3,674,249 A | 7/1972 | McGee | |
| 3,891,197 A | 6/1975 | Poulos | |
| 4,080,768 A | 3/1978 | Trixl | |
| 4,322,061 A | 3/1982 | Masser | |
| 4,611,793 A | 9/1986 | Nishiyama | |
| 4,630,804 A | 12/1986 | Fesko | |
| 4,637,595 A | 1/1987 | Mishima et al. | |
| 4,643,406 A | 2/1987 | Mounier-Poulat et al. | |
| 4,871,188 A | 10/1989 | Baxter | |
| 4,895,350 A | 1/1990 | Schoof et al. | |
| 5,362,095 A | 11/1994 | Eveley | |
| 5,366,238 A | 11/1994 | Stephens | |
| 5,938,221 A | 8/1999 | Wilson | |
| 6,364,333 B1 | 4/2002 | Atkinson | |
| 8,196,943 B2 | 6/2012 | Batdorff | |
| 8,459,676 B2 | 6/2013 | Heimann et al. | |
| 8,540,262 B2 | 9/2013 | Reiter et al. | |
| 9,186,947 B2 | 11/2015 | Kopplow et al. | |
| 2003/0085497 A1 | 5/2003 | Wilson | |
| 2007/0045915 A1 | 3/2007 | Svendsen et al. | |
| 2007/0182074 A1 | 8/2007 | Gennai | |
| 2007/0210549 A1 | 9/2007 | Westnedge | |
| 2009/0256328 A1 | 10/2009 | Dudding et al. | |
| 2014/0138929 A1 | 5/2014 | Wilson et al. | |

FOREIGN PATENT DOCUMENTS

| | | |
|---|---|---|
| DE | 199 46 802 A1 | 4/2001 |
| DE | 10 2009 030 633 A1 | 3/2007 |
| EP | 0 092 399 A2 | 10/1983 |
| EP | 0 162 189 A1 | 11/1985 |
| EP | 0 830 957 A2 | 3/1998 |
| EP | 1 958 801 A2 | 8/2008 |
| FR | 2526110 A2 | 11/1983 |
| GB | 2 174 174 A | 10/1986 |
| JP | 58-61343 A | 4/1983 |
| JP | 58-156408 A | 9/1983 |
| JP | 58-166147 A | 10/1983 |
| JP | 63-25609 | 2/1988 |

OTHER PUBLICATIONS

PCT/US2013/043003 International Search Report and Written Opinion, dated Sep. 9, 2013 (4 pages).
Brochure for "Full Taper Springs" Product Emphasis Program (PEP) No. 6 issued by Dayton Parts, Mar. 2002.

\* cited by examiner

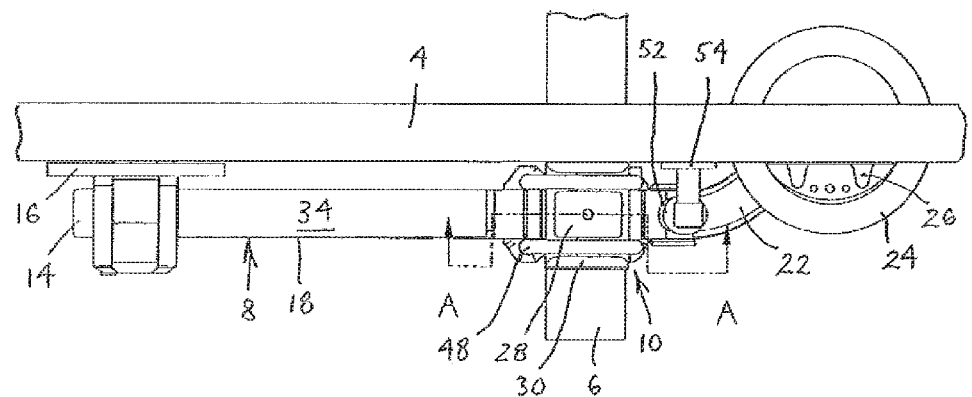

SECTION B-B

SECTION B-B

SECTION B-B

SECTION A-A

SECTION B-B

SECTION A-A

SECTION B-B

SECTION A-A
512

SECTION B-B

SECTION B-B

SECTION C-C

SECTION D-D

SECTION A-A

SECTION B-B

ENERGY STORING SUSPENSION COMPONENTS HAVING RETENTION RECESSES

CROSS-REFERENCE TO RELATED APPLICATION

This application is a divisional of copending application Ser. No. 14/605,021, filed Jan. 26, 2015, which is a divisional of application Ser. No. 13/801,312, filed Mar. 13, 2013, which claims the benefit of U.S. Provisional Patent Application Ser. No. 61/653,223, filed May 30, 2012, and the disclosures of all three applications are hereby incorporated by reference in their entireties.

BACKGROUND OF THE INVENTION

Field of the Invention

The present invention generally relates to suspension systems for wheeled vehicles and trailers, and more particularly to energy storing suspension components having locating and retention features within an axle coupling assembly. This disclosure presents several example embodiments that are representative of energy storing suspension components that may be utilized for particular purposes.

Discussion of the Prior Art

Wheeled vehicles and trailers commonly have suspension systems that utilize energy storing suspension components, such as spring members in the form of a leaf spring, or support members in the form of a trailing arm or support beam, and the like, in suspending a vehicle or trailer frame and/or body assembly above an axle to which wheels are rotatably connected. The suspension system of a vehicle generally may be referred to as the unsprung portion of the vehicle, while the frame and/or body that is carried by the suspension may generally be referred to as the sprung portion of the vehicle. Within the suspension system, the energy storing suspension components are connected to the axle via axle coupling assemblies. For ease of reference, the suspension systems may be said to be a part of a chassis of a wheeled vehicle or trailer, with an understanding that the chassis may include a frame assembly or may be integrally constructed with a body assembly, such as in a so-called unibody construction.

Suspension systems typically include active suspension components designed to isolate from the sprung portion the disturbances encountered by the unsprung portions, such as occur during acceleration and deceleration, or during jounce and rebound of the axle when traversing bumps in a road surface and the like, and to withstand lateral and roll forces, such as are encountered when cornering. Over time, a variety of different suspension components and entire suspension systems have been developed to alter the capacity, ride height, ride comfort, handling characteristics and durability of vehicles and trailers. The desire to alter these features with respect to suspensions may be prompted by a variety factors. However, suspension components, such as energy storing suspension components in the form of spring members, support members, and the like, play a dynamic role within suspension systems and their spring rates, both vertically and laterally, as well as stress levels and the ability to transfer loads to adjacent structures, present complex challenges.

For instance, a vehicle may utilize a traditional leaf spring member that may be relatively thicker in an axle seat portion where the axle is coupled to the spring member within an axle coupling assembly. It is fairly common for a spring member to include an aperture through the center of the spring within the axle seat portion to receive a fastener therethrough, such as a bolt, to assist in holding the spring laterally and longitudinally with respect to the other suspension components for mounting in an axle coupling assembly. This can be helpful during assembly, but unfortunately once the fasteners for the axle coupling assembly are installed and the suspension components are clamped together, it also can cause localization of stresses through the weakened center portion of the spring member having the aperture. This can result in increased likelihood of spring member fracture, due to the localized stresses and potentially an increased likelihood of hydrogen assisted cracking, which may otherwise be referred to as hydrogen embrittlement failure.

In assemblies that include two or more leaf spring components, the outer suspension component may include an end formed with a "military wrap", which encircles the eye of the leaf spring that is mounted to a frame member and provides a redundant feature to retain the leaf spring in the event of a fracture. However, suspensions having a single leaf spring lack such a redundant retention feature. Therefore, if a spring member has fractured within the axle coupling assembly, the opposed portions of the axle seat portion of the spring member and the associated opposed limbs of the spring member, for instance a front limb and rear limb that extend from the axle seat portion, will have a tendency to work their way out of the clamping region of the axle coupling assembly. If one of the fractured portions of the spring member disengages from the axle coupling assembly, the remaining suspension components within the axle coupling assembly likely will permit relative angular movement therebetween, tending to remove the compression within the axle coupling assembly and resulting in further breakdown of the clamping capability of the axle coupling assembly. The loss of clamp load also may permit the axle to shift, resulting in axle misalignment.

Such disengagement of one or more of the fractured portions of a spring member can compromise the integrity of the suspension system and ultimately the handling and safety of the vehicle. Moreover, a fractured spring results in vehicle downtime and costs associated with suspension system repairs. Thus, beyond the potential concerns for safety, spring fracture and disengagement can give rise to concerns relating to a lack of productivity, and to costly and time consuming repairs.

In addition, such a spring member typically will have an axle seat portion having a width and thickness configuration that is intended to be sufficient to withstand concentrated levels of stress in the area of the aperture. Unfortunately, such a configuration may include increased thickness and width of the spring member to be able to overcome the stress concentration that is due to having an aperture through the center of the spring. If an increase in thickness or width is needed, it would result in added mass. Added unsprung mass not only reduces vehicle fuel economy, but also requires greater power to accelerate the vehicle, greater breaking capacity to stop the vehicle, and undesirable ride characteristics.

Some prior art devices have included relatively deep depressions in one surface of a spring member, with the depressions extending through the spring member and producing corresponding projections outward from an opposed surface. Such depressions can require a large amount of energy to form, but also tend to result in weakened areas that are susceptible to localized stresses and shearing due to the thin material cross-sections in the effective sidewalls of the depressions. Thus, the depressions may have been added for locating purposes, but in turn, may lead to further disadvantages relating to potential stress concentration and fracture within the prior art suspension systems.

The present disclosure addresses shortcomings found in prior art suspension systems for wheeled vehicles and trailers and in energy storing suspension components utilized therein.

SUMMARY OF THE INVENTION

The present disclosure generally provides suspension systems and energy storing suspension components for wheeled vehicles and trailers that have features that can provide spring members, support members, and the like, with enhanced performance characteristics. The suspension systems may be utilized in front or rear suspensions of chassis for motored vehicles, as well as trailers. By including in an energy storing suspension component at least one surface having at least two spaced apart retention recesses that receive respective protrusions that extend from other suspension components within an axle coupling assembly, the energy storing suspension component is subjected to less stress concentration and a reduced risk of failure in a central region of the axle seat portion of the energy storing suspension component, while importantly providing locating structures and retention redundancy in the event of a such a failure.

Having the recesses spaced apart from each other and from the center of the axle seat portion of the energy storing suspension component also tends to locate the recesses in lower stress regions of the axle seat portion, which helps to reduce the likelihood of stress concentration and fracture. This, in turn, provides a system to maintain suspension component locations and clamp load integrity within the axle coupling assembly in the event of an energy storing suspension component fracture in a central region of the axle seat portion. The energy storing suspension components disclosed herein also may be provided in underslung or an overslung configurations relative to the vehicle axle to which the energy storing suspension component is connected.

By utilizing spaced apart relatively shallow retention recesses in a surface of an energy storing suspension component, such as a spring member, support member, or the like, an axle coupling assembly may eliminate the need for a central bolt. In assemblies that otherwise would not have a central bolt, the locating and retention features assist in properly aligning and retaining the relative position of the suspension components within an axle coupling assembly, without having to rely entirely on the friction generated between the clamped suspension components. This may permit some reduction in the required clamp load necessary to maintain the lateral and longitudinal positioning of the energy storing suspension component within the axle coupling assembly.

With the lower stress levels facilitated by the lack of a central aperture in the axle seat portion, the energy storing suspension component also is less susceptible to hydrogen assisted cracking. In some configurations, this may allow a slightly thinner axle seat portion, leading to a reduction in the overall mass of the energy storing suspension component. Such a reduction in unsprung weight would provide improved ride characteristics, due to the reduced influence of displaced unsprung mass, for instance, during jounce and rebound of a wheel. Reductions in unsprung mass also can have a positive influence on fuel economy and help to reduce the power required to accelerate the vehicle and the braking capacity required to stop the vehicle.

The protrusions that extend from other suspension components within axle coupling assemblies are received by and engage the recesses in the surface of the energy storing suspension component. Such protrusions may be located in any of the suspension components that are disposed in close enough proximity to the energy storing suspension component to have the protrusions received in the retention recesses. For example, the protrusions may extend from a coupling pad, such as a first or second coupling pad that may be in the form of a top or bottom pad of an axle coupling assembly. In such an example, the protrusions would engage corresponding recesses in the energy storing suspension component in a respective first or second surface, such as a top or bottom surface, of the energy storing suspension component. The protrusions may alternatively extend from an intermediary suspension component, such as a shock coupling bracket, a spacer, or a caster or pinion wedge, or another form of an axle seat bracket. It also is possible to have spaced apart recesses in opposed surfaces of the energy storing suspension component, which will receive protrusions that extend from two other suspension components within the axle coupling assembly. In each of these alternative configurations, the protrusions will help locate and retain an energy storing suspension component within an axle coupling assembly, even in the event of a fracture in the center of the axle seat portion. It will be appreciated that throughout this disclosure, with respect to the descriptions of all of the examples provided, terms such as top, bottom, upper, lower, left, right, front and rear, all are relative terms and are not intended to be limiting because they depend on the context in which they are used and the relative position of the device at the time.

The energy storing suspension component, in the form of a spring member, support member, or the like, may include a further positive locating feature, such as a fastener, which may for example be in the form of a post, a stud or a bolt protruding from a surface of the energy storing suspension component. The fastener may be received in a bore or other recess in one of the other suspension components that is connected to the energy storing suspension component by an axle coupling assembly. With the contribution to alignment and retention of the suspension components that is provided by the at least two recesses in the energy storing suspension component and the corresponding protrusions in another suspension component, a central bolt through the energy storing suspension component may still be employed, if desired. However, it may be possible that such a bolt would be of a smaller diameter, which would permit a smaller aperture through the energy storing suspension component, reducing the concentration of stresses otherwise produced with a larger aperture through the energy storing suspension component.

There are numerous additional variations in suspension components that are contemplated and considered to be within the scope of this disclosure, including for instance suspension components having recesses and/or protrusions in configurations that are not located along a central axis of a suspension component, or are in an asymmetric configuration. Depending on the coupling configuration and desired location of the suspension components relative to the sprung portion of the wheeled vehicle or trailer, a front and/or rear end of an energy storing suspension component may be formed with a configuration to be operatively coupled to a frame member. For instance, a frame member front or rear coupling assembly may engage a front or rear end of an energy storing suspension component that is formed into a coupling portion, such as an eye. An eye may be formed as an upturned eye, a Berlin eye, a downturned eye, or in any other suitable shape.

An end of an energy storing suspension component could be connected to a frame assembly via other suspension components, such as an air spring or a shock absorber. An end of an energy storing suspension component also may be formed as a straight end having parallel or tapered top and bottom surfaces, such as may be configured to be operatively coupled to a frame member coupling that is configured with a wear plate that may be in the form of a slipper pad or a cam. The suspension components also may be configured to include additional suspension components within an axle coupling assembly, such as one or more additional energy storing suspension components in the form of a further spring member, or a support member, such as a trailing arm or beam. The further suspension components also may include retention recesses and/or protrusions to assist in retaining the suspension components within an axle coupling assembly.

In a first aspect, disclosed herein is an energy storing suspension component that includes an axle seat portion, a first end, and a first limb extending between the axle seat portion and the first end. The axle seat portion including opposed first and second surfaces with at least one of the first and second surfaces having at least two spaced apart recesses with each being spaced from a center of the axle seat portion. The recesses are configured to receive respective protrusions extending from at least one suspension component that is connected to the energy storing suspension component when coupled within an axle coupling assembly, and the surface of the axle seat portion that is opposed to the location of the at least two spaced apart recesses is flush with or recessed relative to a surrounding portion of the opposed surface.

In a second aspect, disclosed herein is a suspension system that includes an axle coupling assembly that includes a first coupling pad and a second coupling pad, and an energy storing suspension component having an axle seat portion, a first end, and a first limb extending between the axle seat portion and the first end. The energy storing suspension component is disposed between the first and second coupling pads of the axle coupling assembly, and the axle seat portion of the energy storing suspension component includes opposed first and second surfaces with at least one of the first and second surfaces having at least two spaced apart recesses that are spaced from a center of the axle seat portion. The recesses are configured to receive respective protrusions extending from at least one suspension component within the suspension system that is connected to the energy storing suspension component by the axle coupling assembly, and the surface of the axle seat portion that is opposed to the location of the at least two spaced apart recesses is flush with or recessed relative to a respective surrounding portion of the opposed surface.

Thus, the present disclosure presents examples of suspension systems and energy storing suspension components to be advantageously used in such suspension systems for the chassis of wheeled vehicles and trailers.

It is to be understood that both the foregoing general description and the following detailed description are exemplary and provided for purposes of explanation only, and are not restrictive of the subject matter claimed. Further features and objects of the present disclosure will become more fully apparent in the following description of example embodiments and from the appended claims.

BRIEF DESCRIPTION OF THE DRAWINGS

In describing the preferred examples, reference is made to the accompanying drawing figures wherein like parts have like reference numerals, and wherein:

FIG. 1E is a top view of the portion of the suspension system shown in FIG. 1A.

FIGS. 1F and 1G are cross-sectional views taken through the Section A-A in FIG. 1E, and showing the axle coupling assembly and a portion of the energy storing suspension component but without a fastener in the top surface for a better view the central region of the axle seat portion of the energy storing suspension component which is unbroken in FIG. 1F and fractured in FIG. 1G.

Figure 1A:
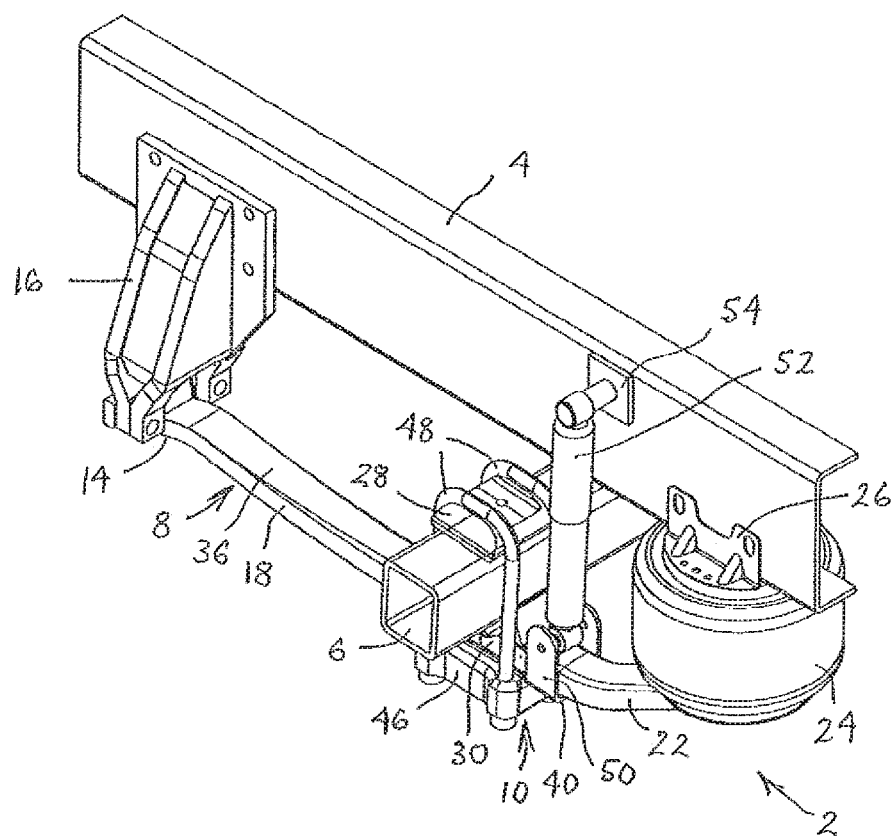
FIG. 1A is a front perspective view of a first example of a portion of a suspension system that is located along a frame member of a wheeled vehicle or trailer and includes an energy storing suspension component that is connected to an axle by an axle coupling assembly.
Figure 1B:
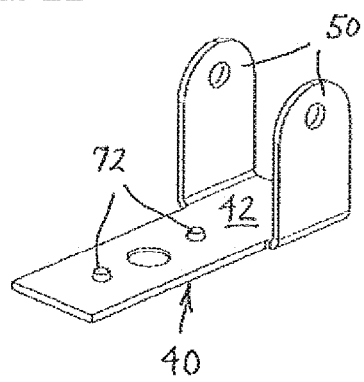
FIGS. 1B and 1C are top and bottom perspective views of a shock coupling bracket that is used in the suspension system in the first example shown in FIG. 1A.
Figure 1C:
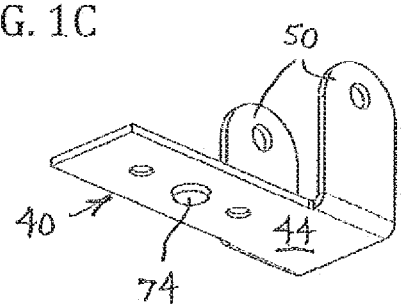

It should be understood that the drawings are not to scale. While some mechanical details of suspension systems, including details of fastening means, connection to well known vehicle suspension components, and other plan and section views of the particular suspension components, have been omitted, such details were removed for better viewing of the main suspension components and are considered within the comprehension of those skilled in the art in light of the present disclosure. It also should be understood that the present disclosure is not limited to the examples illustrated.

DETAILED DESCRIPTION

This disclosure presents suspension systems and energy storing suspension components, such as spring members, support members, and the like, that may be used in chassis, on the front or rear of wheeled vehicles or trailers. Several example suspension systems and energy storing suspension components for use in the suspension systems are disclosed herein. It will be understood that the illustrations of the example suspension systems include views of a suspension system on the right side of a vehicle, with perspective and side views shown from the left side of the assembly, and that the suspension system on the left side of the vehicle would be constructed as a mirror image of the system shown for the right side of the vehicle. It also will be apparent that each example energy storing suspension component includes an axle seat portion, a first end, and a first limb extending between the axle seat portion and the first end. Further, the first end and first limb of the energy storing suspension components may be referring to a front end and front limb, a rear end and rear limb, or may be referring to one portion of an energy storing suspension component having both front and rear ends and front and rear limbs that include the aforementioned configuration, and that numerous additional configurations and uses are contemplated.

Turning to FIGS. 1A-1I, a first example suspension system 2 is illustrated for coupling a longitudinally extending frame member 4 on one side of a chassis of a wheeled vehicle or trailer to a laterally extending axle 6 that is disposed below the frame member 4. It will be appreciated that throughout the examples, the axle may be of any configuration and may be constructed as a cast structure, or as a fabricated structure, such as by welding together steel portions, or may be constructed of any other suitable materials. As previously noted, with the drawings of this first example and the drawings of the other examples in this disclosure, it will be appreciated that the figures show a suspension system for one side of a wheeled vehicle or trailer and a similar system would be provided on the opposite side to form a full suspension system for a vehicle axle. The first example suspension system 2 includes an energy storing suspension component 8, which in this first example is in a support member configuration. It will be appreciated that the energy storing suspension components within this disclosure may be of varying configurations and preferably will be constructed of steel, or other suitable materials, such as by rolling, stamping, casting or other suitable methods.

In this example, the energy storing suspension component 8 is in an underslung configuration, extending longitudinally below the laterally extending axle 6. Also, the axle 6 is operatively coupled to the energy storing suspension component 8 by an axle coupling assembly 10 that is configured to connect the axle 6 to the energy storing suspension component 8. The energy storing suspension component 8 of this example includes an axle seat portion 12 of the energy storing suspension component 8 that is generally defined by the region that is clamped within the axle coupling assembly 10. The energy storing suspension component 8 includes a first end 14 that is formed into a coupling portion to be coupled to the frame member 4 by a first coupling bracket 16 and a suitable bushing and fasteners. The coupling portion in this instance is formed into a Berlin eye. A first limb 18 of the energy storing suspension component 8 extends between the axle seat portion 12 and the first end 14. The energy storing suspension component 8 of this first example includes a second end 20 and a second limb 22 that extends between the axle seat portion 12 and the second end 20. In this example, using suitable fasteners, the second end 20 is coupled to an air spring 24, which is coupled to a second coupling bracket 26 that, in turn is coupled to the frame member 4.

From the top of the axle coupling assembly 10 downward, the axle coupling assembly 10 includes a first coupling pad 28, also known as a first mounting pad, guide plate or clamp plate, which in this configuration engages a top surface of the axle 6. The first coupling pads within this disclosure may be constructed of steel, cast iron or other suitable materials. An optional spacer 30, or a caster or pinion wedge, has a top surface that engages the bottom surface of the axle 6, and a bottom surface that engages a top surface of a liner 32. In this example, the spacer 30 introduces a caster or pinion angle to the axle 6, and throughout this disclosure, the spacers may be constructed of steel, cast iron, aluminum or other suitable materials. The liner 32 is optional and where used within this disclosure, it preferably is constructed of galvanized sheet metal, rubber or other suitable materials. A bottom surface of the liner 32 engages a top or first surface 34 of the energy storing suspension component 8. An opposed bottom or second surface 36 of the energy storing suspension component 8 engages a shock coupling bracket 40 on a top or first surface 42, thereof. The shock coupling bracket is provided to facilitate mounting of a dampener, such as a shock absorber, and this type of bracket may be constructed of stamped steel or other suitable materials.

The shock coupling bracket 40 has a bottom or second surface 44 that engages a top surface of a second coupling pad 46, also known as a second mounting pad, guide plate or clamp plate. Throughout this disclosure, the second coupling pads may be constructed of steel, cast iron or aluminum, or other suitable materials. In this example, the second coupling pad 46 has four apertures therethrough, and the legs of a pair of U-shaped bolts 48 pass through the respective apertures to permit the U-shaped bolts 48 to clamp together the aforementioned suspension components of the axle coupling assembly 10 between the first and second coupling pads 28, 46, respectively, to couple the axle 6 to the energy storing suspension component 8. The U-shaped bolts referred to throughout this disclosure are shown with a simplified view of fasteners, such as nuts, and may be constructed of steel, or any other suitable material.

The shock coupling bracket 40 has a pair of upstanding flanges 50 for coupling to the lower end of a shock absorber 52, such as by a nut and bolt, or other suitable fastener. Similar fasteners may be used to couple the upper end of the shock absorber 52 to a mounting bracket 54, and, in turn, to couple the mounting bracket 54 to the frame member 4.

Figure 1D:
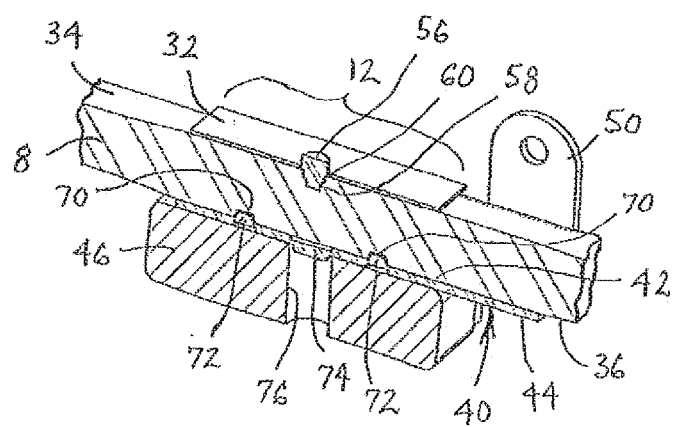
FIG. 1D is a cross-section of a portion of the energy storing suspension component, a lower coupling pad, a shock coupling bracket and a spring liner that are used in the suspension system in the first example shown in FIG. 1A.
Figure 1H:
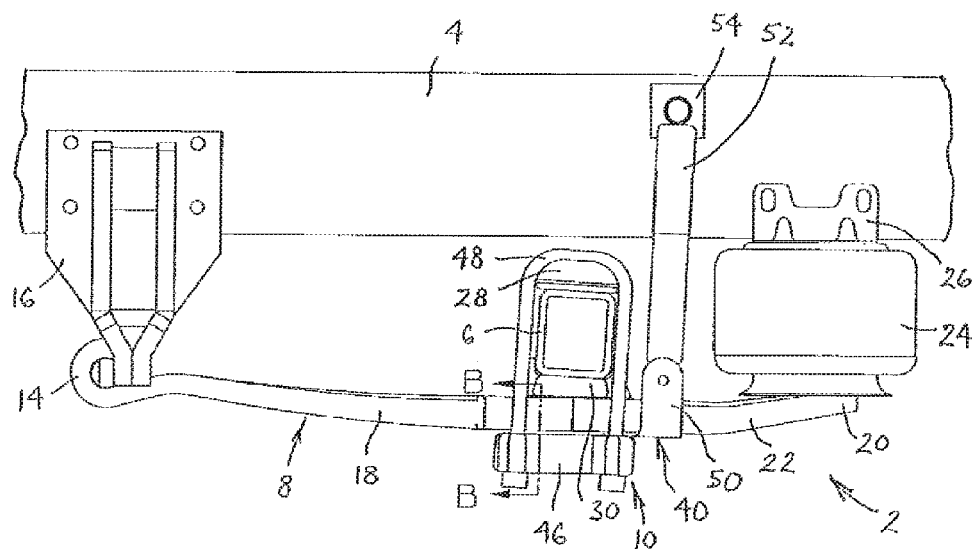
FIG. 1H is a side view of the portion of the suspension system shown in FIG. 1A.
Figure 1I:
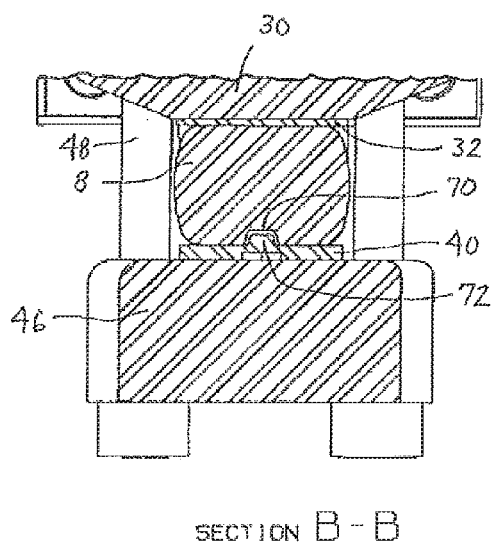
FIG. 1I is a cross-sectional view taken through the Section B-B in FIG. 1H.

This first example suspension system 2 also includes retention features that provide advantages over common energy storing suspension components and axle coupling assemblies, and which may be seen in FIGS. 1D and 1F. For instance, the spacer 30 includes upstanding locating projections 38 that engage the sides of the axle 6 and assist in retaining the positioning of the suspension components within the axle coupling assembly 10. The energy storing suspension component 8 has a fastener 56, shown for example in the form of a post or stud, extending from the top or first surface 34 of the energy storing suspension component 8, which in this first example is located in the center of an axle seat portion 12.

The fastener 56 is connected to the energy storing suspension component 8, such as by embedding it by heat staking, which creates a recess 58 in the first surface 34 of the energy storing suspension component 8. It will be appreciated that the fastener may be provided and connected in an alternative manner, such as a bolt threaded into a shallow bore, by welding, or by other suitable means of connection. The liner 32 includes an aperture 60 through which the fastener 56 extends. The fastener 56 also engages a bore 62 in the spacer 30, which in this example is configured as an aperture through the spacer 30. The engagement of the fastener 56 with the bore 62 helps locate and retain the positioning of the spacer 30 relative to the energy storing suspension component 8, without requiring a full aperture and bolt through the energy storing suspension component 8. The lack of an aperture through the center of the energy storing suspension component 8 reduces the stress concentration within the center of the axle seat portion 12 of the energy storing suspension component 8. As noted above, this reduces the likelihood of an energy storing suspension component fracture, and therefore, may permit the energy storing suspension component 8 to be made somewhat thinner through the axle seat portion 12, saving weight.

Importantly, in addition, the energy storing suspension component 8 of the first example includes two retention recesses 70 in its bottom or second surface 36. As may be appreciated in FIGS. 1D and 1F, the retention recesses 70 are spaced apart and are spaced from the center of the axle seat portion 12 of the energy storing suspension component 8, which is where the fastener 56 is located. Thus, the recesses 70 are located in relatively lower stress regions of the energy storing suspension component 8, and in this example, as may be seen in FIG. 1I, they are centrally located laterally in the energy storing suspension component 8, although it will be appreciated that other positioning may be utilized. As may be seen in FIGS. 1D, 1F and 1I, while there are recesses 70 in the second surface 36 of the axle seat portion 12 of the energy storing suspension component 8, they are relatively shallow and do not extend through the energy storing suspension component 8. For example, when using an energy storing suspension component 8 having a thickness of two inches, the recesses 70 may have a depth of around one quarter inch. Accordingly, the first surface 34 of the energy storing suspension component 8 that is opposed to the location of the recesses 70 in the second surface 36 is not disrupted by the opposed recesses 70 and may remain flush with the surrounding portion of the opposed first surface 34. Indeed, the depth of the recesses 70 will depend in part on the thickness and material used in the energy storing suspension component 8, so as to permit the opposed first surface 34 to be flush or even to include recesses, while still including significant material thickness around the recesses 70 and in the axle seat portion 12. This also helps reduce the amount of material flow needed when forming the recesses and the corresponding protrusions, and reduces the likelihood of fractures of the energy storing suspension component 8 in the axle seat portion 12.

The retention recesses 70 receive corresponding respective protrusions 72 extending from the top or first surface 42 of the shock coupling bracket 40. The shock coupling bracket 40 also includes a protrusion 74 from its bottom or second surface 44 that engages the second coupling pad 46, such as by being received in a bore 76. In this example, the bore 76 is shown as an aperture through the second coupling pad 46, but it will be appreciated that the bore 76 could alternatively be formed with a bottom, as a recess. The protrusions 72 and 74 have a relatively short profile that is less susceptible to shearing, and may be formed by coining, by adding material to the first and second surfaces 42, 44, respectively, of the shock coupling bracket 40, or by any other suitable method. In this example, the protrusions 72 would be slightly shorter in height than the one quarter inch depth of the recesses, to allow clearance, and are formed in a shock coupling bracket 40 that may have a thickness of around one quarter inch.

As noted above, with the protrusions 72 received in the retention recesses 70, if the energy storing suspension component 8 is fractured, its limbs will be retained within the axle coupling assembly 10. Thus, the protrusions 72 extending from the first surface 42 of the shock coupling bracket 40 are received in the retention recesses 70 in the second surface 36 of the energy storing suspension component 8, and if the energy storing suspension component 8 fractures in the central region of the axle seat portion 12, as shown in FIG. 1G, the first and second limbs 18, 22, respectively, will be retained within the axle coupling assembly 10. FIGS. 1F and 1G are shown with the fastener 56 removed for better viewing of the central region of the axle seat portion 12.

Having the protrusions 72 received in the retention recesses 70 provides for retention of the first and second limbs 18, 22, respectively, within the axle coupling assembly 10. This is important to the ability to maintain the clamp load within the axle coupling assembly 10 and to avoid disengagement of a limb, and the previously discussed problems associated therewith. Thus, in this first example, the shock coupling bracket 40 is the suspension component that includes the protrusions 72 that engage the recesses 70 in the axle seat portion 12 of the energy storing suspension component 8. The shock coupling bracket 40 is disposed below the energy storing suspension component 8. In this first example, the interaction between the protrusions 72, 74 of the shock coupling bracket 40 and the retention recesses 70 of the energy storing suspension component 8 and bore 76 in the second coupling pad 46, help to retain the suspension components within the axle coupling assembly 10. This reduces the clamp load required to keep the suspension components from shifting laterally or longitudinally, which may then lead to use of smaller diameter U-shaped bolts 48, enabling still further weight reduction.

Figure 1J:
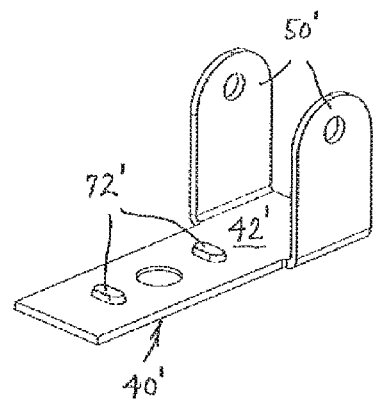
FIGS. 1J and 1K are top and bottom perspective views of an alternative shock coupling bracket to that shown in FIGS. 1B and 1C.
Figure 1K:
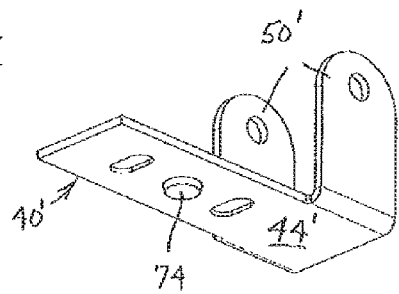
Figure 2A:
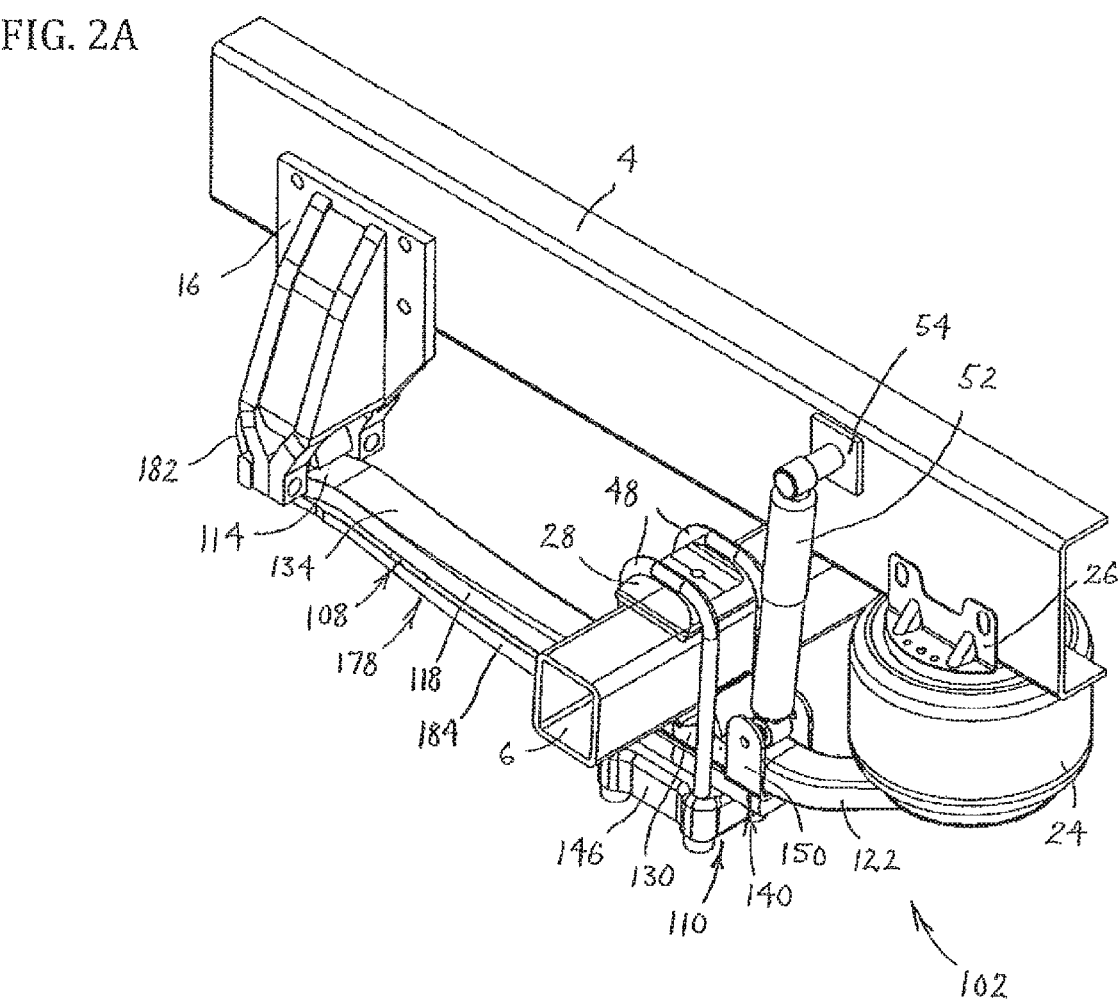
FIG. 2A is a front perspective view of a second example of a portion of a suspension system that is located along a frame member of a wheeled vehicle or trailer and includes an energy storing suspension component that is connected to an axle by an axle coupling assembly.
Figure 2B:
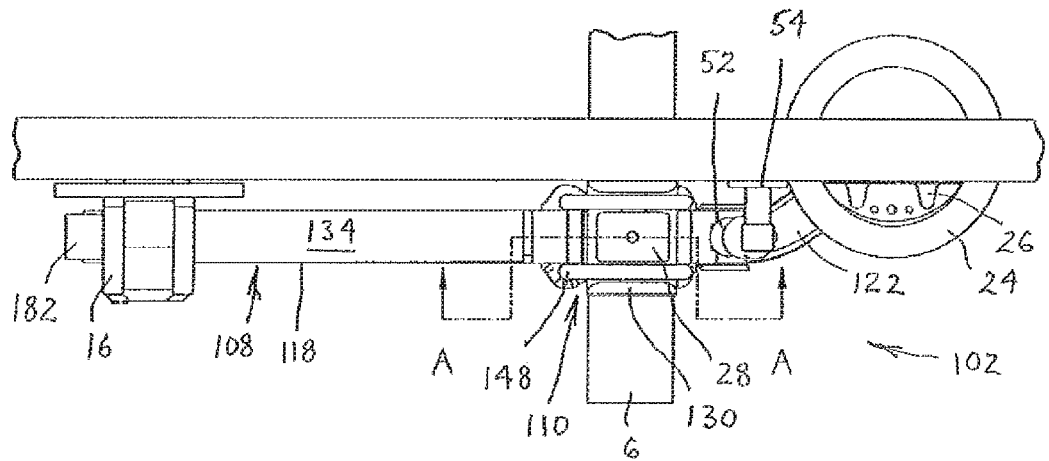
FIG. 2B is a top view of the portion of the suspension system shown in FIG. 2A.
Figure 2C:
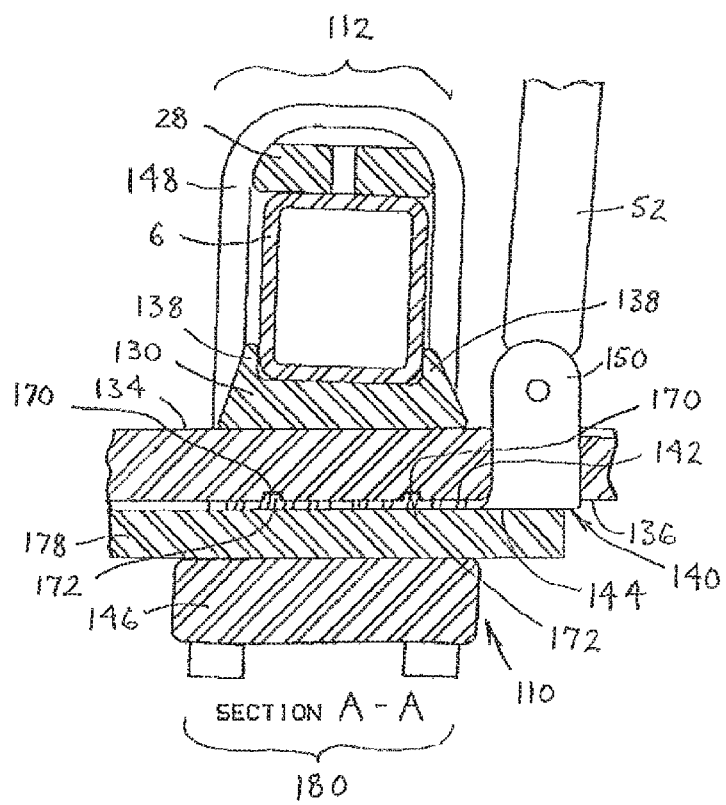
FIG. 2C is a cross-sectional view taken through the Section A-A in FIG. 2B.
Figure 2D:
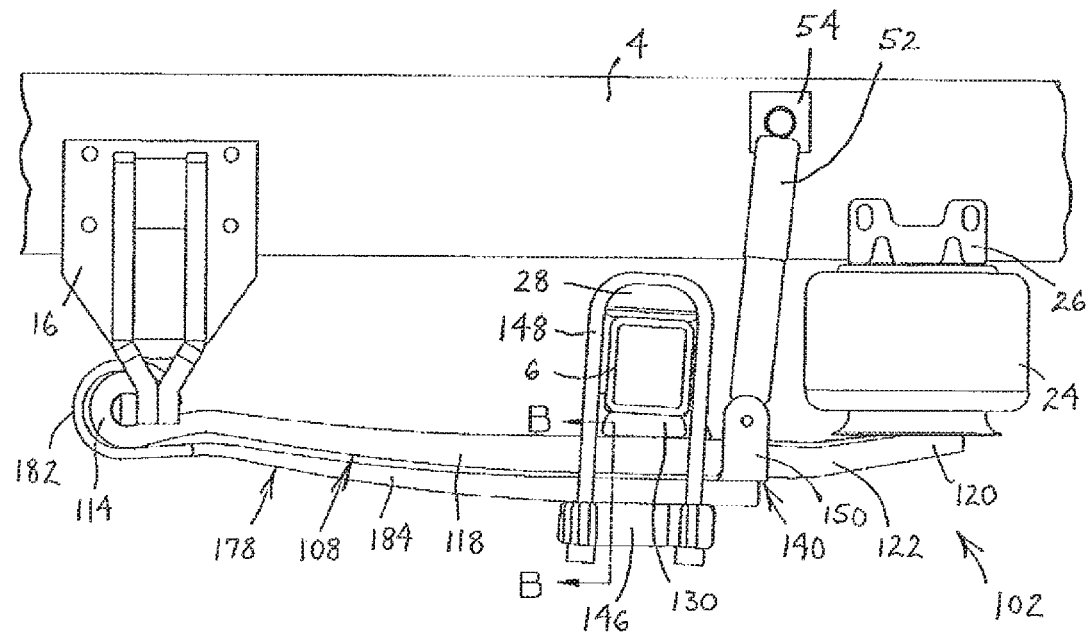
FIG. 2D is a side view of the portion of the suspension system shown in FIG. 2A.
Figure 2E:
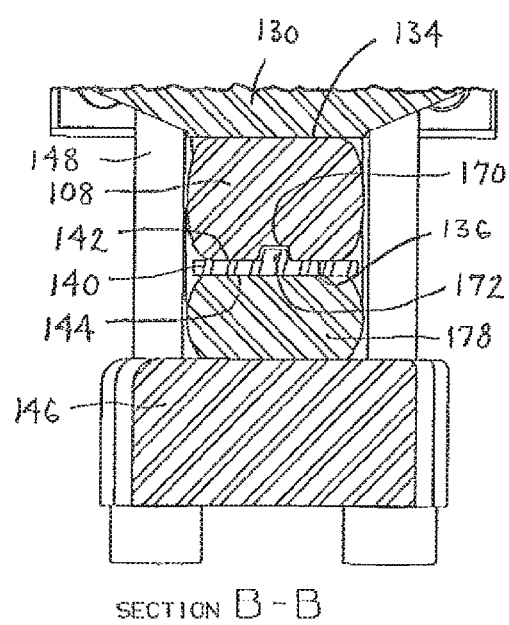
FIG. 2E is a cross-sectional view taken through the Section B-B in FIG. 2D.
Figure 3A:
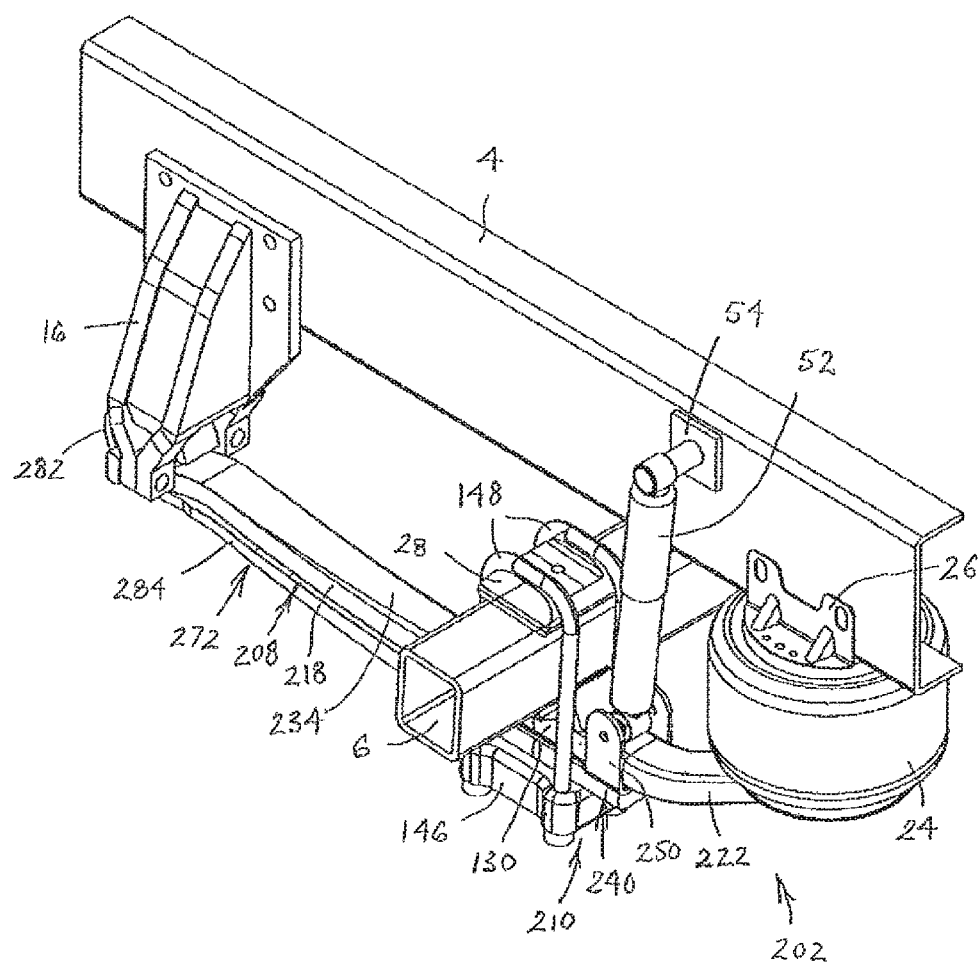
FIG. 3A is a front perspective view of a third example of a portion of a suspension system that is located along a frame member of a wheeled vehicle or trailer and includes an energy storing suspension component that is connected to an axle by an axle coupling assembly.
Figure 3B:
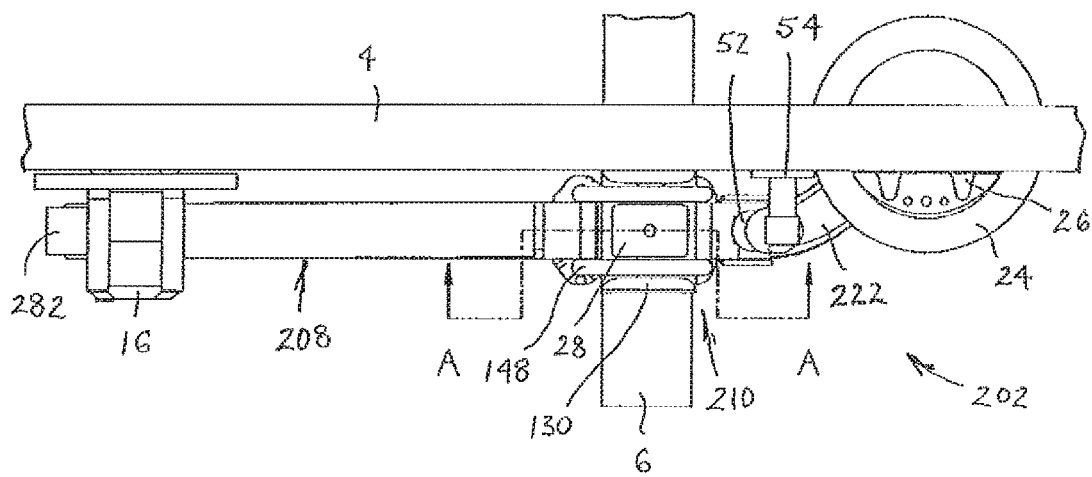
FIG. 3B is a top view of the portion of the suspension system shown in FIG. 3A.
Figure 3C:
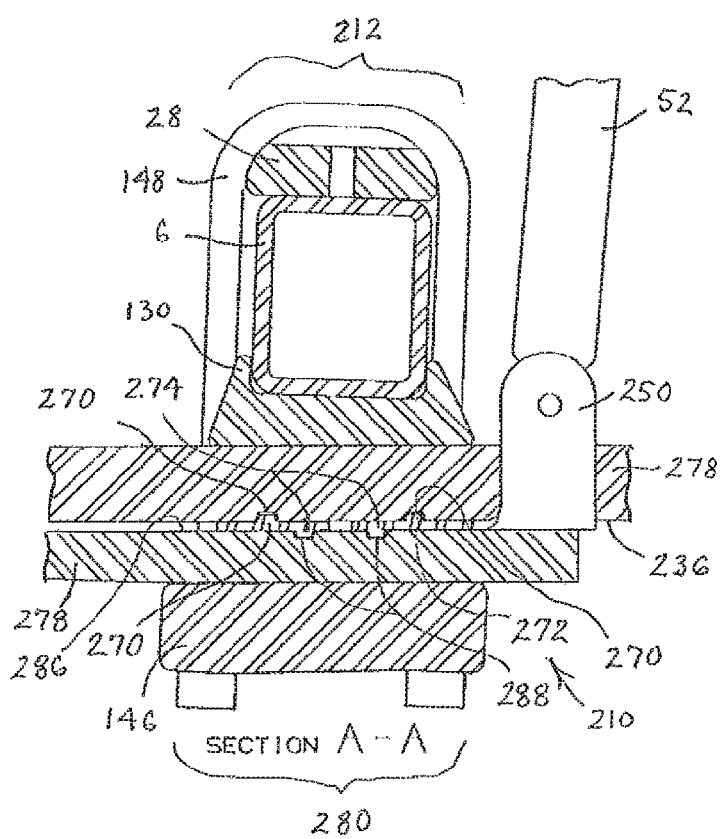
FIG. 3C is a cross-sectional view taken through the Section A-A in FIG. 3B.
Figure 3D:
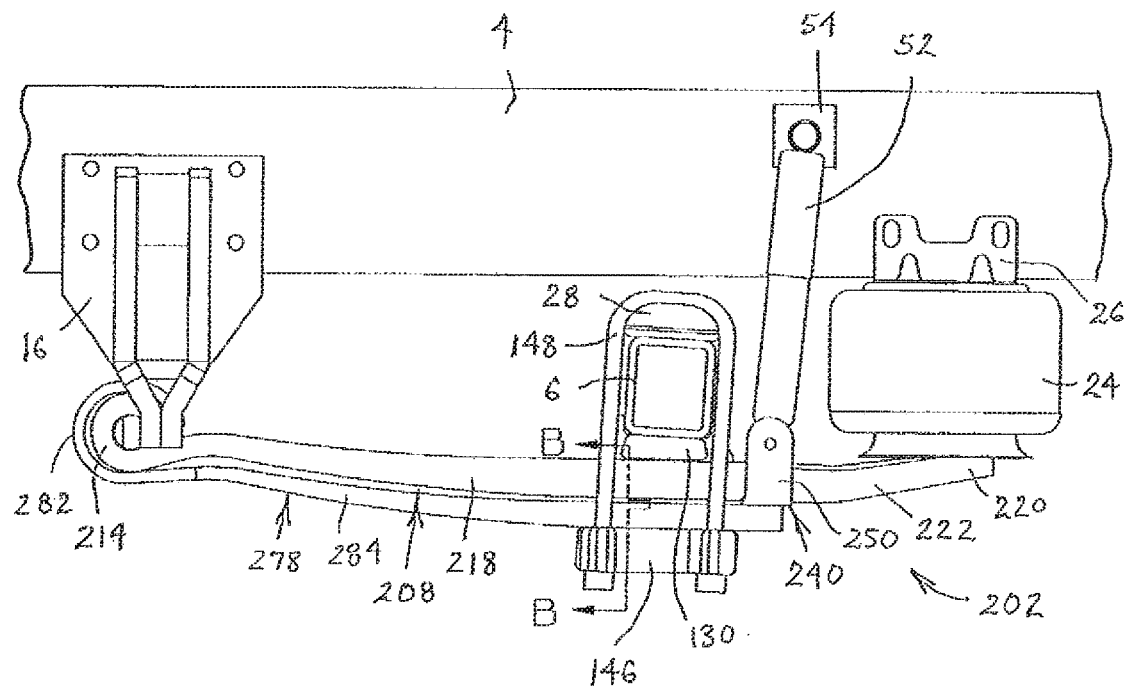
FIG. 3D is a side view of the portion of the suspension system shown in FIG. 3A.
Figure 3E:
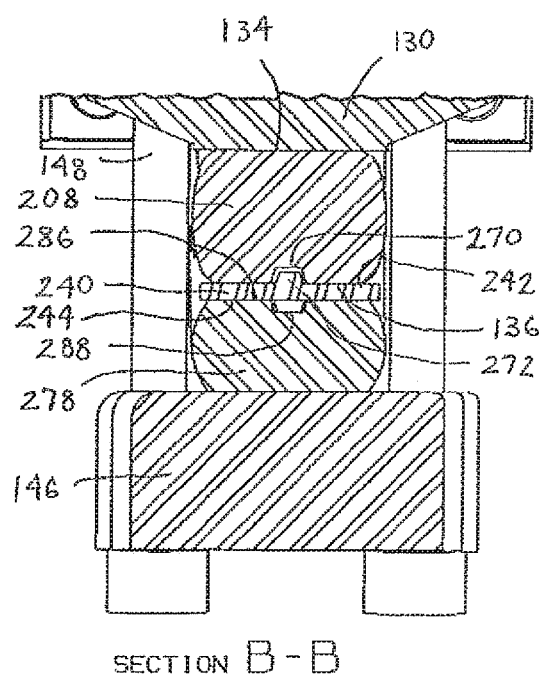
FIG. 3E is a cross-sectional view taken through the Section B-B in FIG. 3D.
Figure 4A:
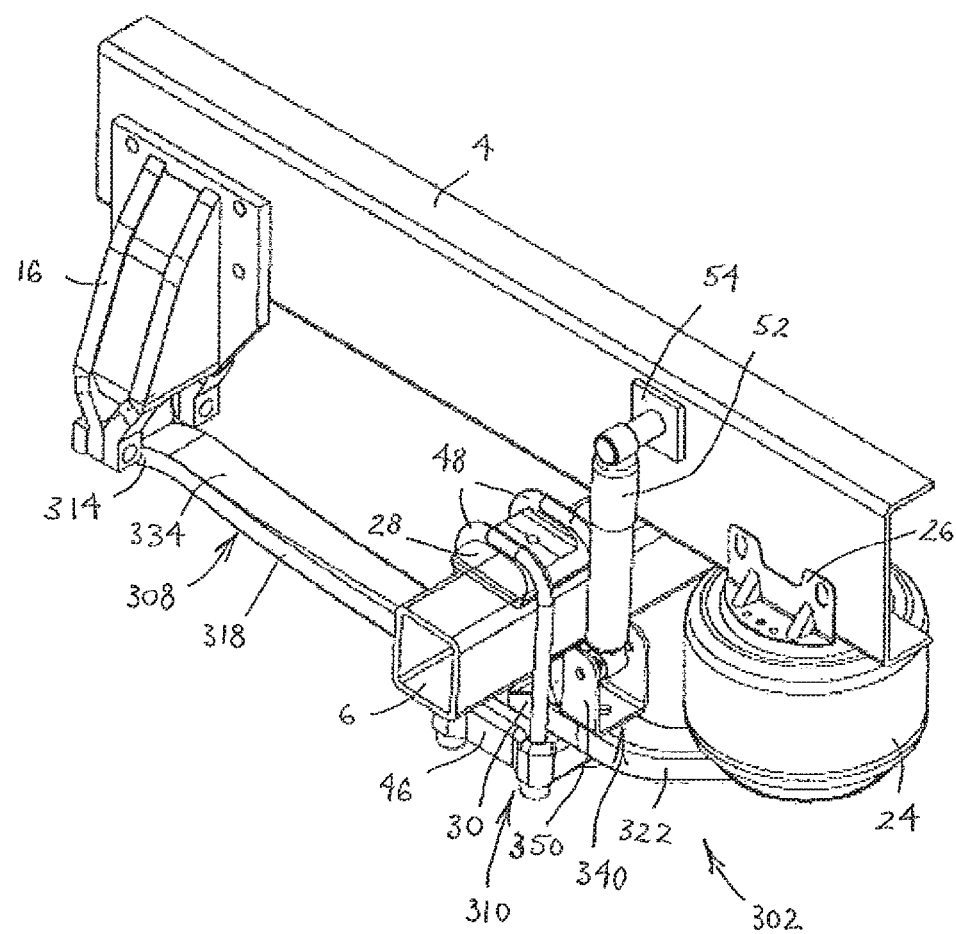
FIG. 4A is a front perspective view of a fourth example of a portion of a suspension system that is located along a frame member of a wheeled vehicle or trailer and includes an energy storing suspension component that is connected to an axle by an axle coupling assembly.
Figure 4B:
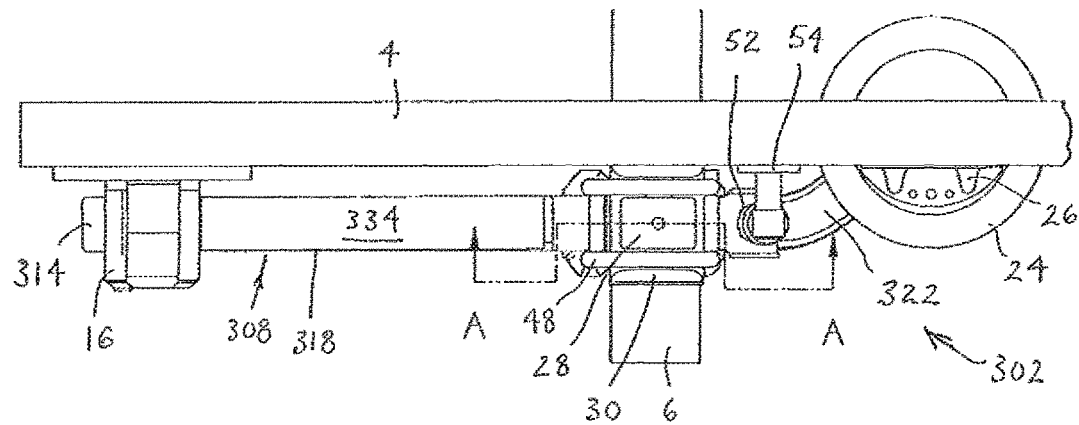
FIG. 4B is a top view of the portion of the suspension system shown in FIG. 4A.
Figure 4C:
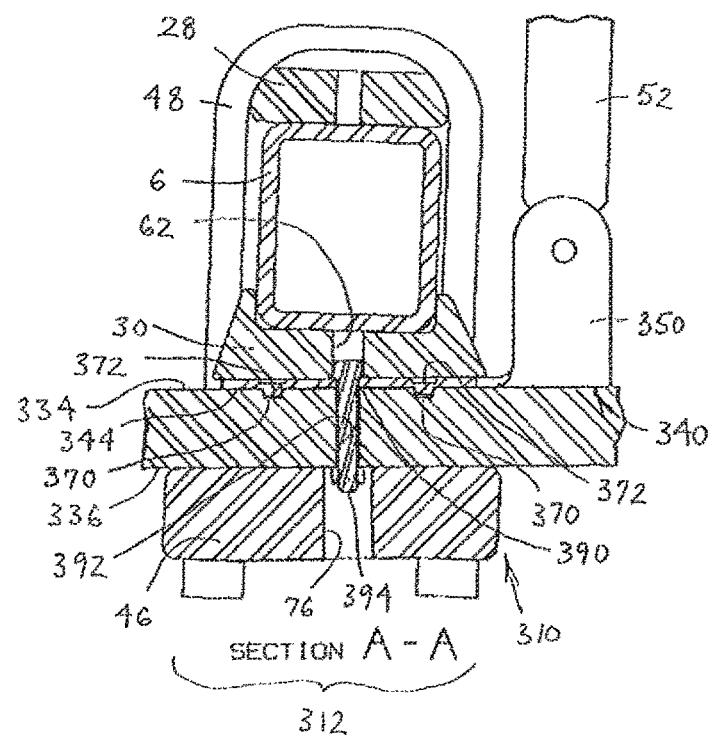
FIG. 4C is a cross-sectional view taken through the Section A-A in FIG. 4B.
Figure 4D:
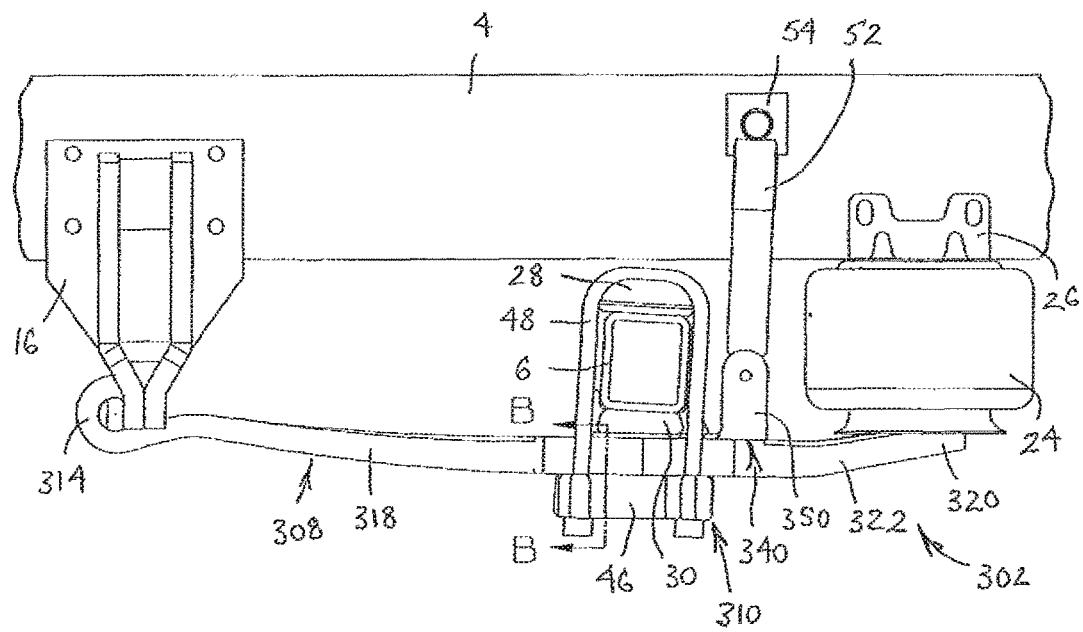
FIG. 4D is a side view of the portion of the suspension system shown in FIG. 4A.
Figure 4E:
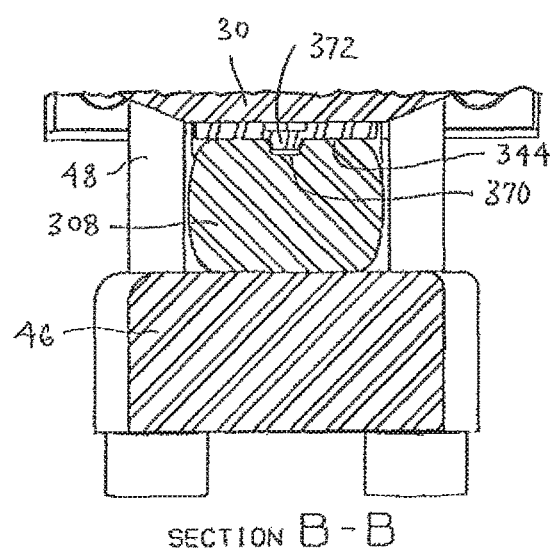
FIG. 4E is a cross-sectional view taken through the Section B-B in FIG. 4D.
Figure 5A:
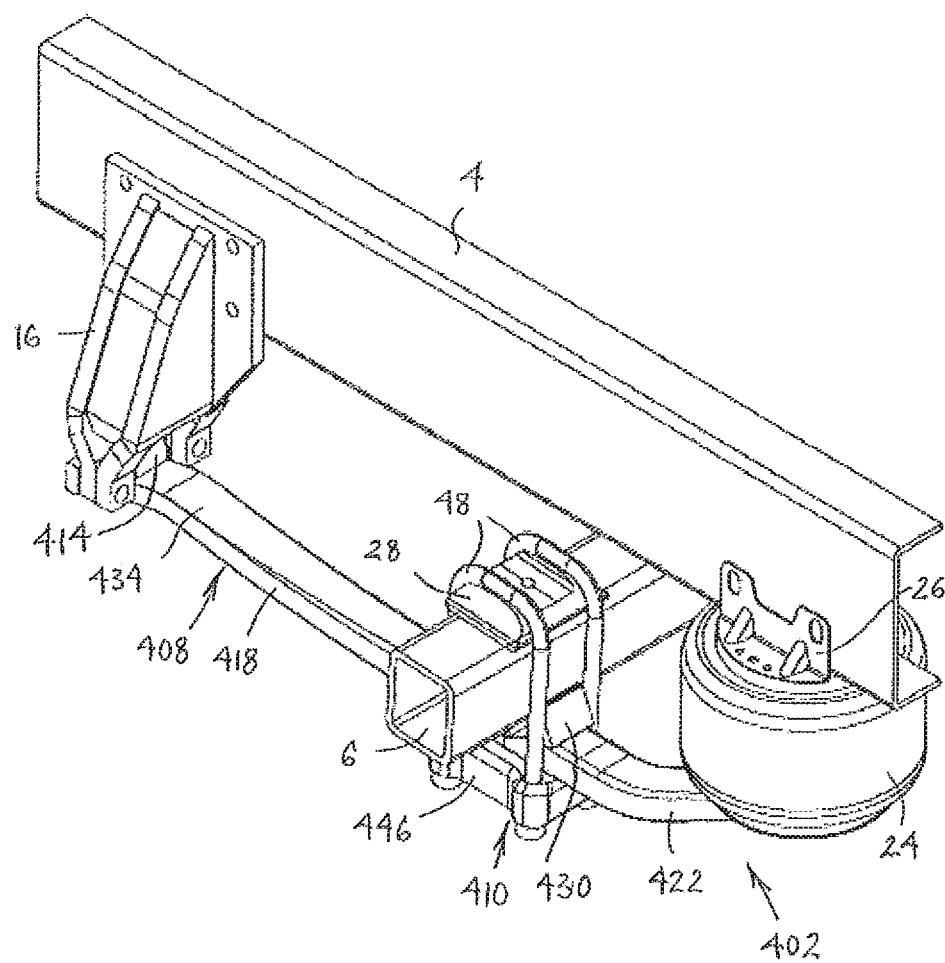
FIG. 5A is a front perspective view of a fifth example of a portion of a suspension system that is located along a frame member of a wheeled vehicle or trailer and includes an energy storing suspension component that is connected to an axle by an axle coupling assembly.
Figure 5B:
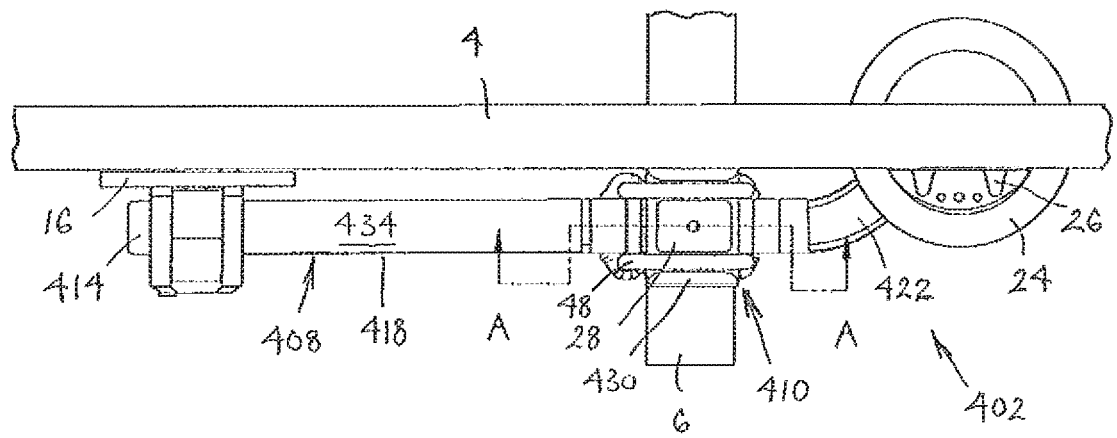
FIG. 5B is a top view of the portion of the suspension system shown in FIG. 5A.
Figure 5C:
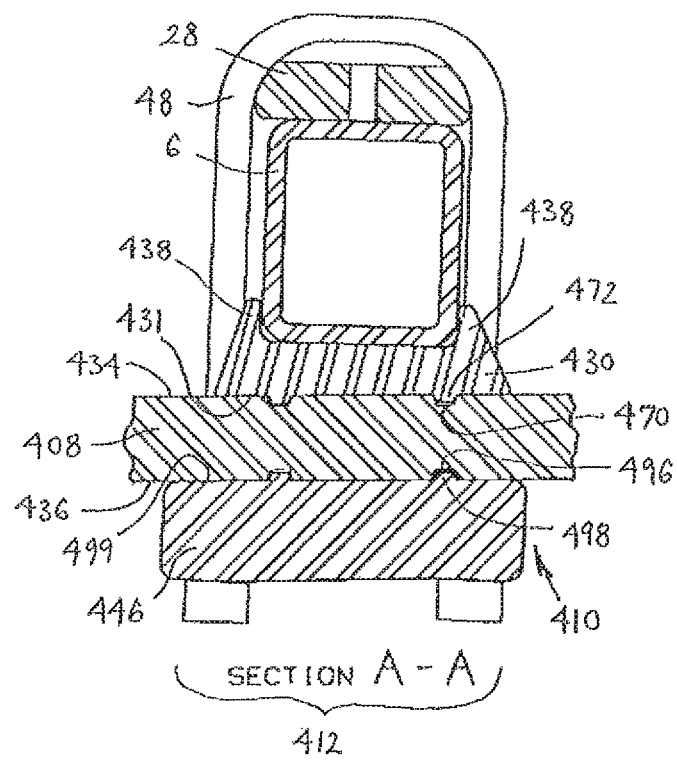
FIG. 5C is a cross-sectional view taken through the Section A-A in FIG. 5B.
Figure 5D:
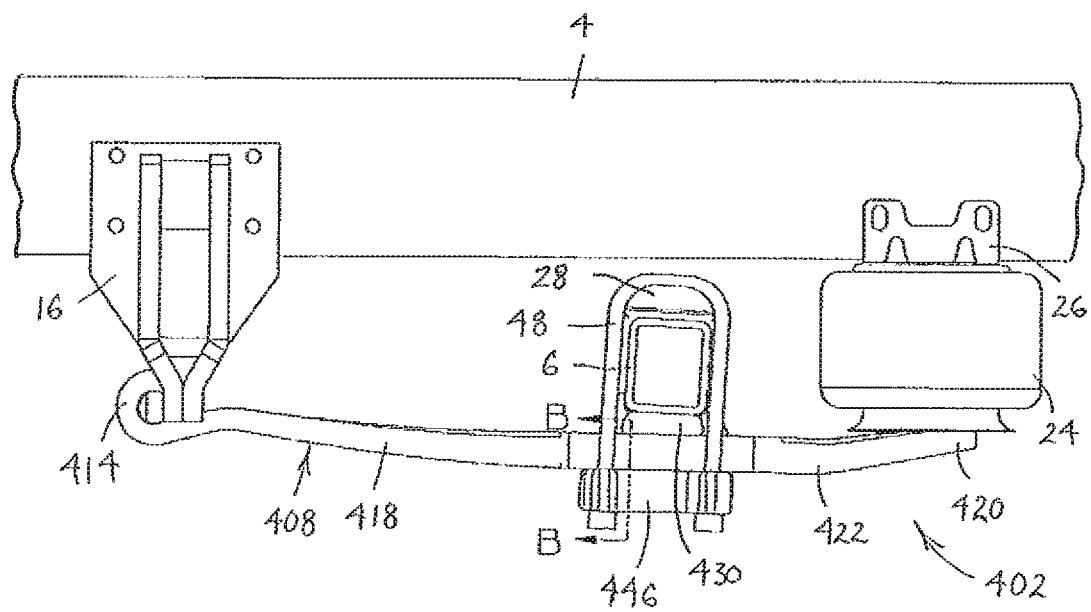
FIG. 5D is a side view of the portion of the suspension system shown in FIG. 5A.
Figure 5E:
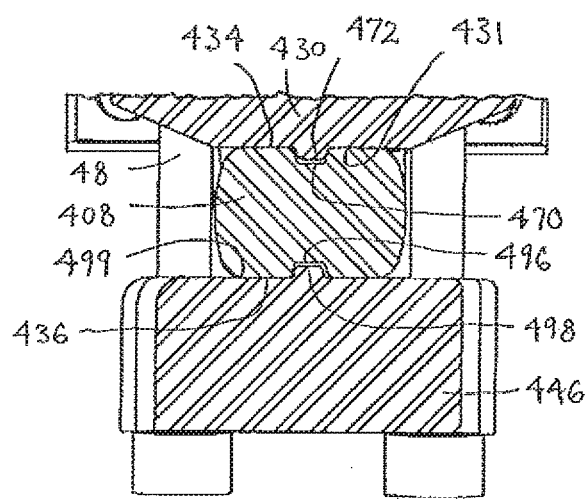
FIG. 5E is a cross-sectional view taken through the Section B-B in FIG. 5D.
Figure 6A:
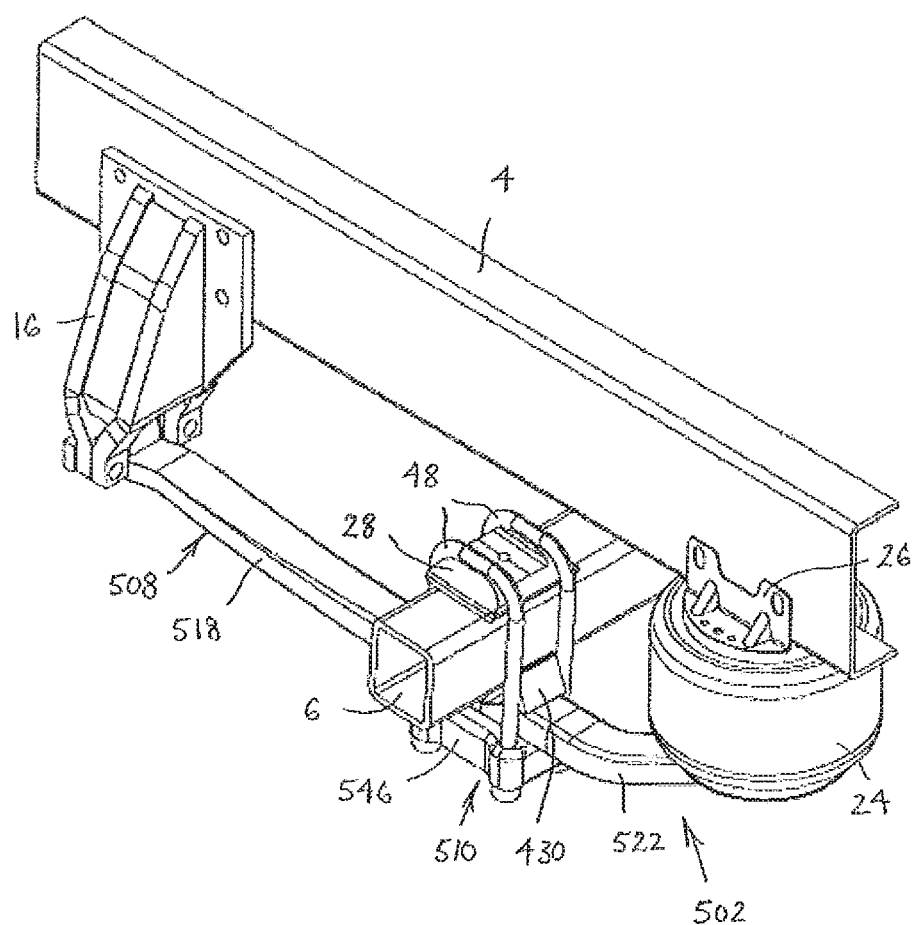
FIG. 6A is a front perspective view of a sixth example of a portion of a suspension system that is located along a frame member of a wheeled vehicle or trailer and includes an energy storing suspension component that is connected to an axle by an axle coupling assembly.
Figure 6B:
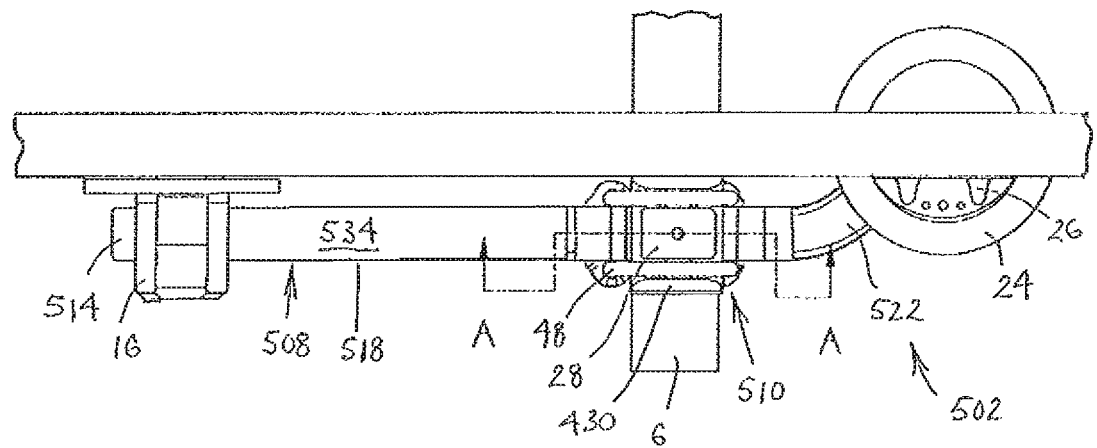
FIG. 6B is a top view of the portion of the suspension system shown in FIG. 6A.
Figure 6C:
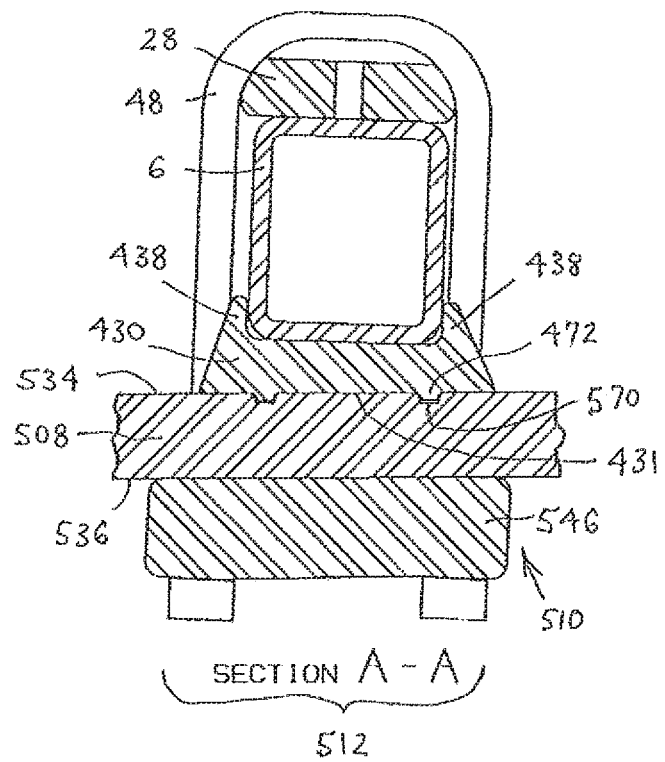
FIG. 6C is a cross-sectional view taken through the Section A-A in FIG. 6B.
Figure 6D:
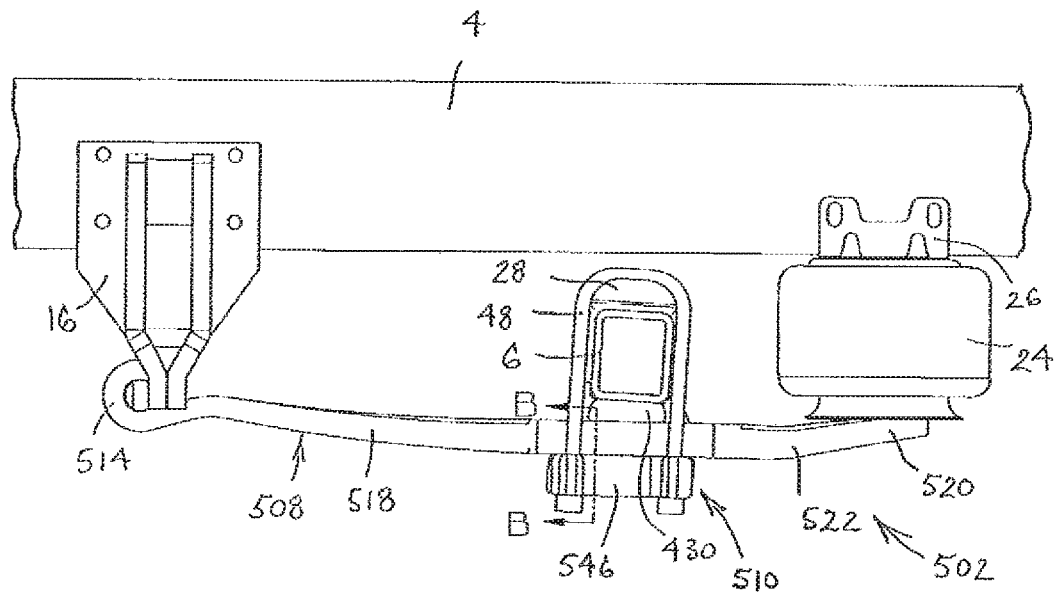
FIG. 6D is a side view of the portion of the suspension system shown in FIG. 6A.
Figure 6E:
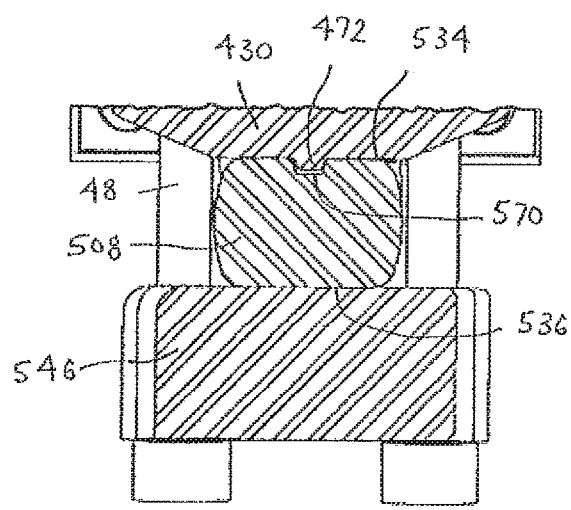
FIG. 6E is a cross-sectional view taken through the Section B-B in FIG. 6D.
Figure 7A:
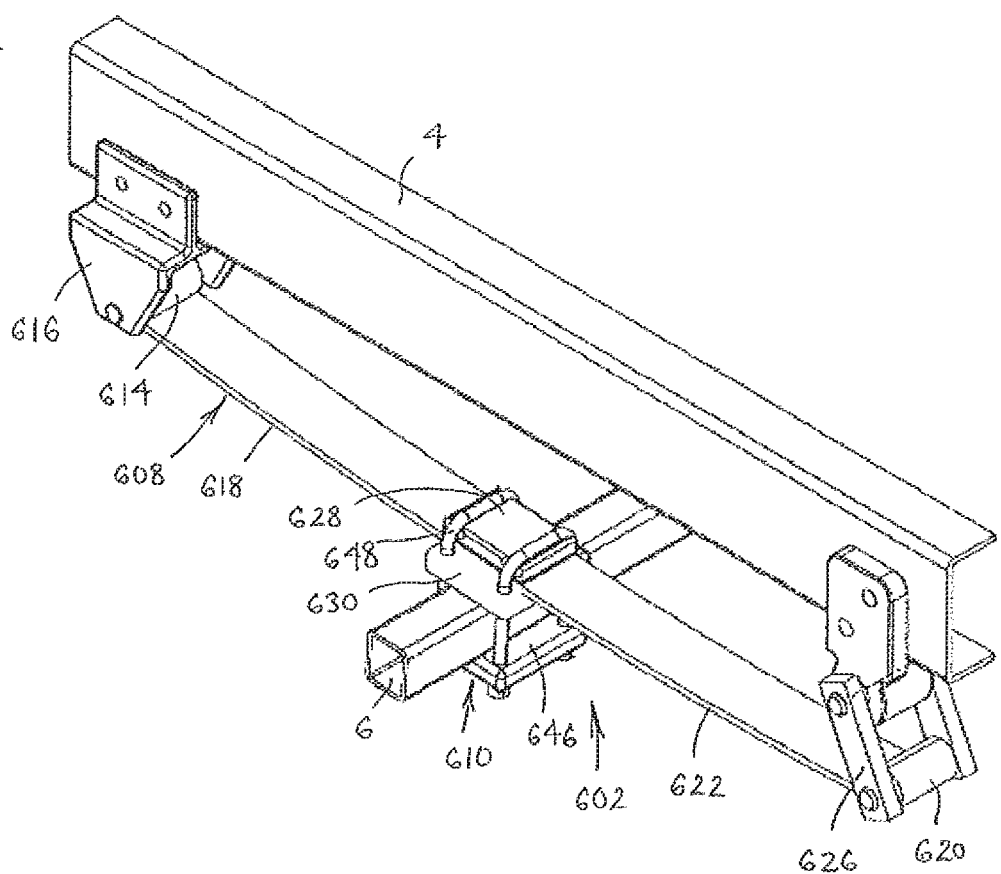
FIG. 7A is a front perspective view of a seventh example of a portion of a suspension system that is located along a frame member of a wheeled vehicle or trailer and includes an energy storing suspension component that is connected to an axle by an axle coupling assembly.
Figure 7B:
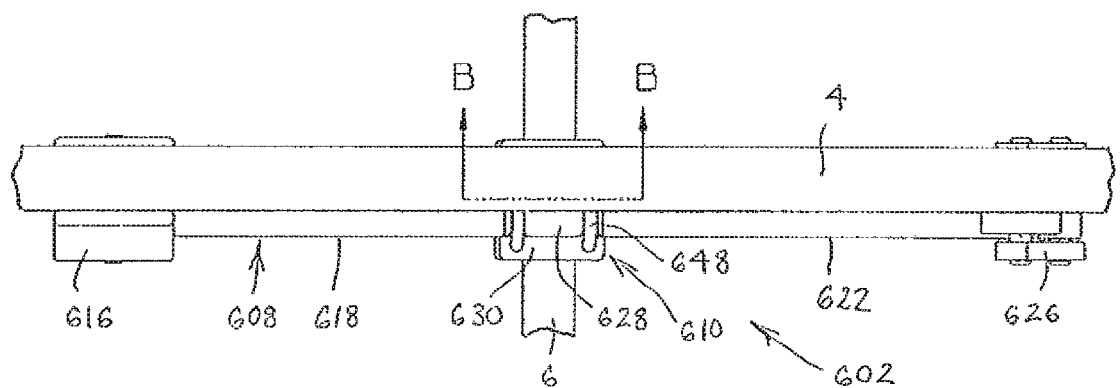
FIG. 7B is a top view of the portion of the suspension system shown in FIG. 7A.
Figure 7C:
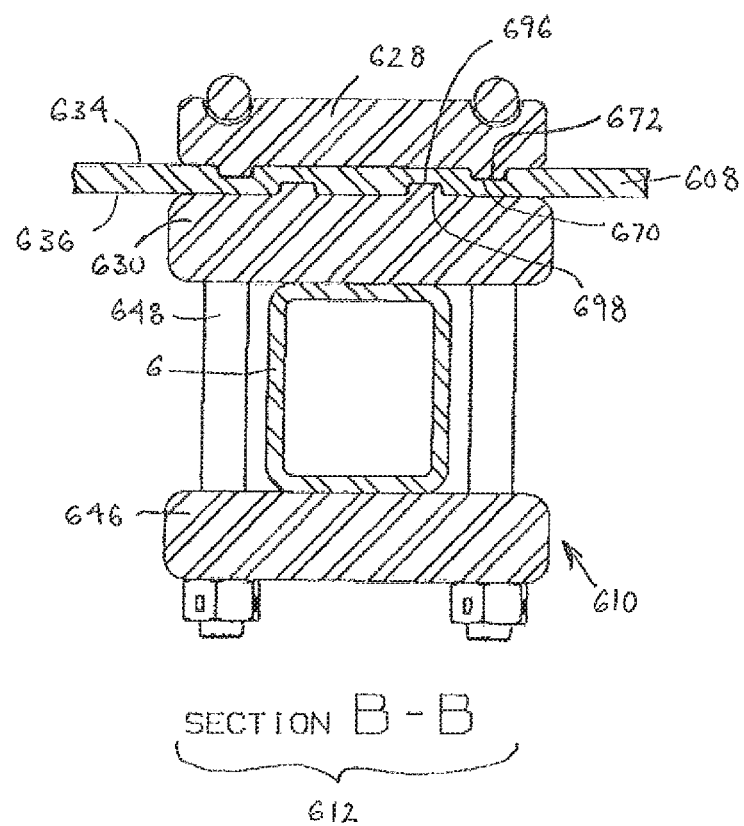
FIG. 7C is a cross-sectional view taken through the Section B-B in FIG. 7B.
Figure 7D:
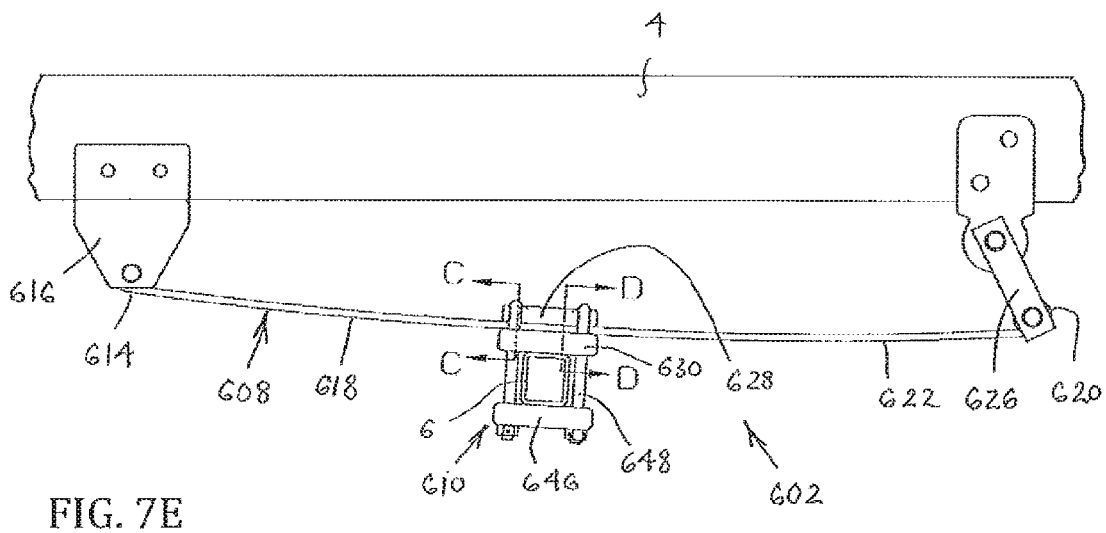
FIG. 7D is a side view of the portion of the suspension system shown in FIG. 7A.
Figure 7E:
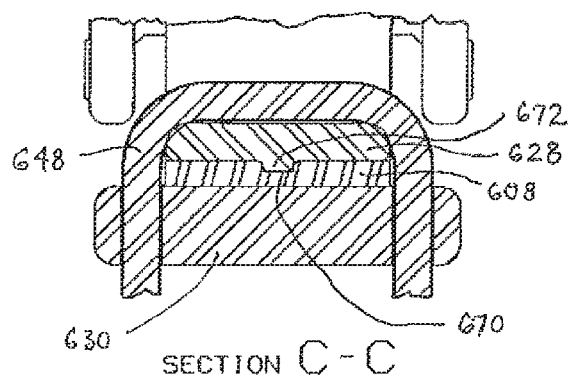
FIG. 7E is a cross-sectional view taken through the Section C-C in FIG. 7D.
Figure 7F:
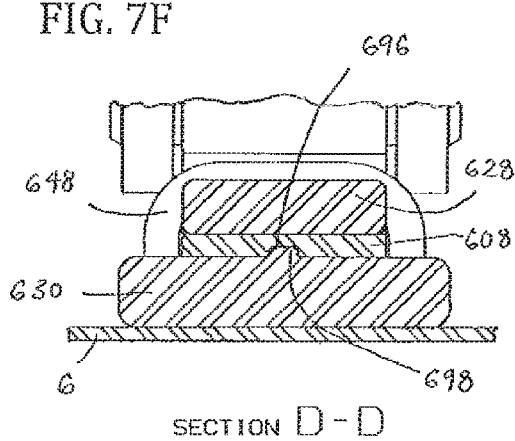
FIG. 7F is a cross-sectional view taken through the Section D-D in FIG. 7D.
Figure 8A:
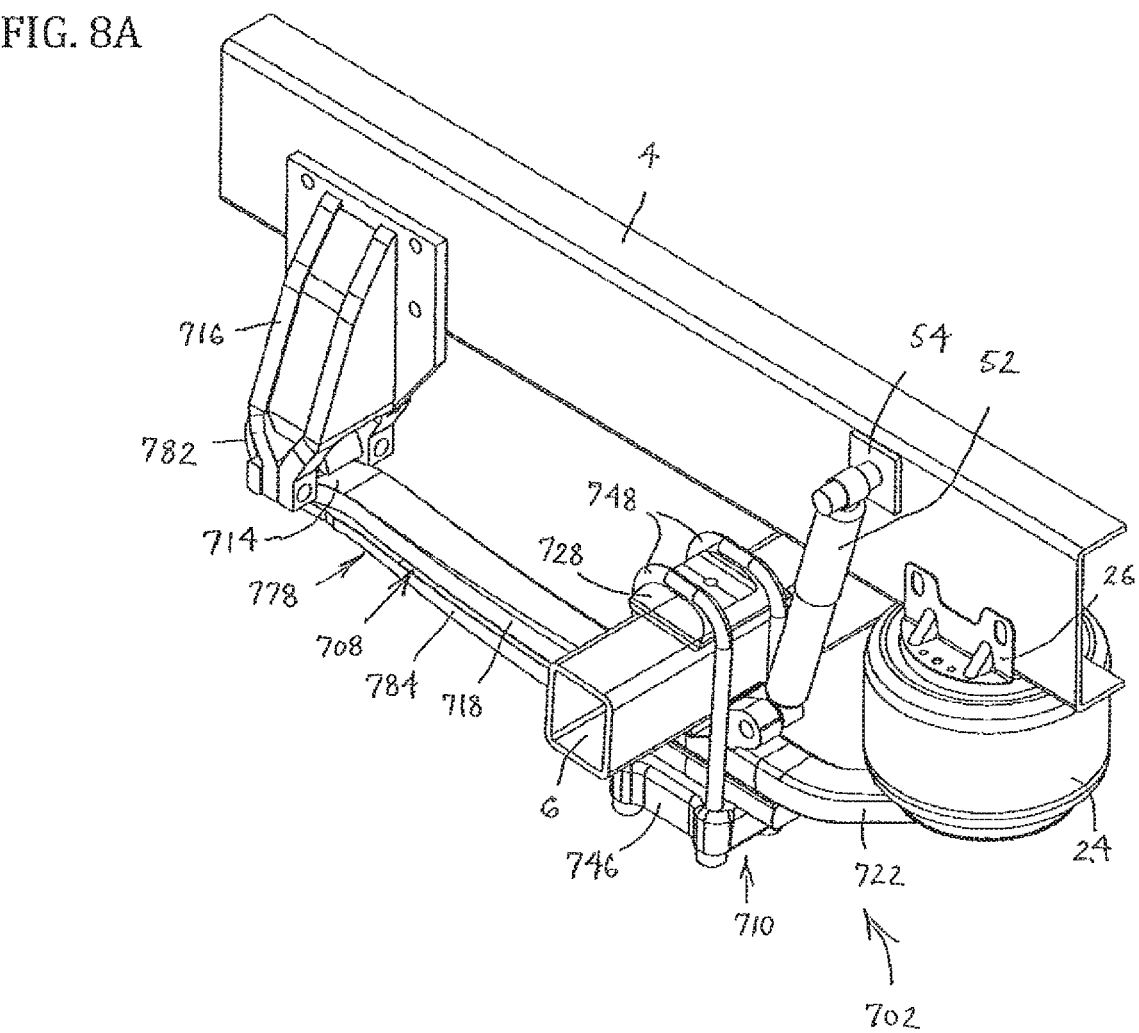
FIG. 8A is a front perspective view of an eighth example of a portion of a suspension system that is located along a frame member of a wheeled vehicle or trailer and includes an energy storing suspension component that is connected to an axle by an axle coupling assembly.
Figure 8B:
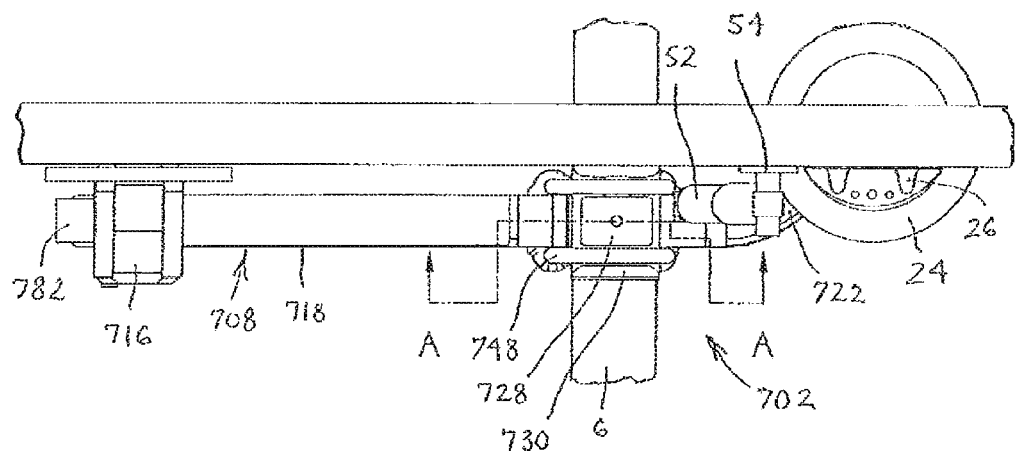
FIG. 8B is a top view of the portion of the suspension system shown in FIG. 8A.
Figure 8C:
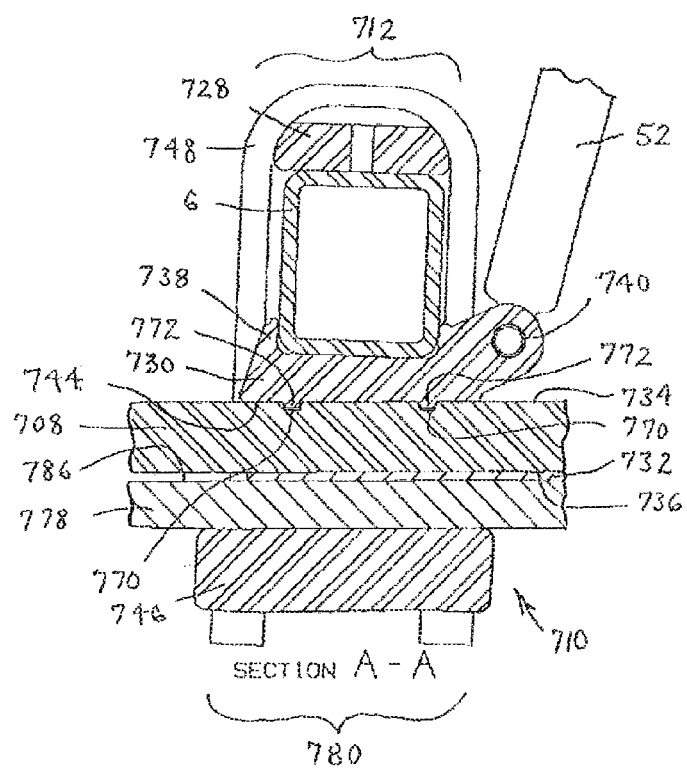
FIG. 8C is a cross-sectional view taken through the Section A-A in FIG. 8B.
Figure 8D:
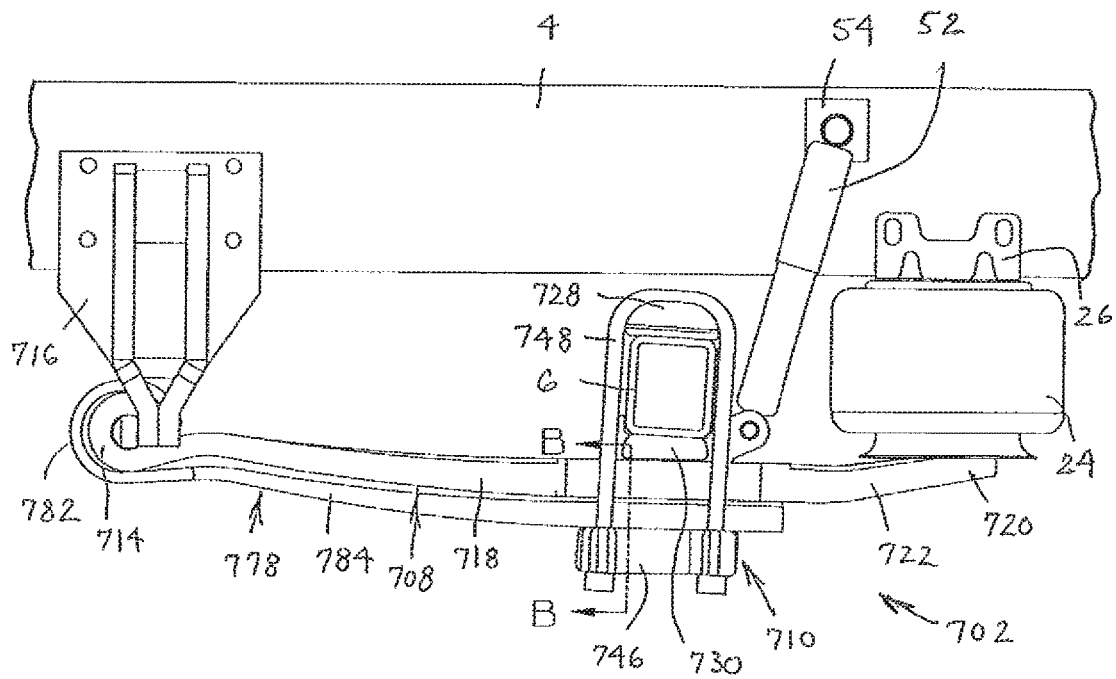
FIG. 8D is a side view of the portion of the suspension system shown in FIG. 8A.
Figure 8E:
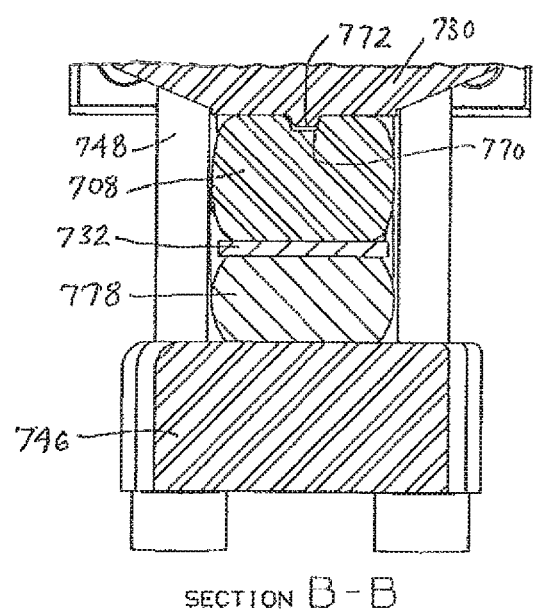
FIG. 8E is a cross-sectional view taken through the Section B-B in FIG. 8D.

An alternative configuration for the protrusions 72 is shown in FIGS. 1J and 1K, where a shock coupling bracket 40' has first and second opposed surfaces 42', 44', respectively. Protrusions 72', having an elongated shape, extend from the first surface 42' and the recesses 70 in the energy storing suspension component 8 would have to be shaped accordingly to receive the protrusions 72'. The opposed second surface 44' includes the same single circular protrusion 74 extending therefrom, as was shown in the shock coupling bracket of FIGS. 1B and 1C. It will be appreciated that other shapes could be used for the protrusions and corresponding recesses that receive the protrusions.

The seven other examples disclosed herein within FIGS. 2A-8E, show alternative configurations to that of the first example in FIGS. 1A-1F and 1H-1I. The additional examples help to illustrate that further alternative versions have been contemplated, while demonstrating that there are many other suspension systems and energy storing suspension components that may incorporate the advantageous structures disclosed herein to avoid shortcomings in the prior art. For ease of reference, like parts will receive like reference numerals, and their discussion need not be repeated in its entirety.

For instance, a second example suspension system 102 is shown in FIGS. 2A-2E, which includes several suspension components from the first example suspension system 2 that are configured and used in a similar way, and whose previous description of like suspension components will be relied upon for the second example, as well. However, this second example suspension system 102 does differ from the first example in several ways. For instance, the energy storing suspension component 108 of the second example is somewhat similar to the support member 8 shown in the first example, and includes a first end 114 that is formed into a coupling portion to be coupled to the frame member 4 by a first coupling bracket 16 and a suitable bushing and fasteners. The coupling portion in this instance is formed into a Berlin eye. A first limb 118 of the energy storing suspension component 108 extends between the axle seat portion 112 and the first end 114. The energy storing suspension component 108 of this second example includes a second end 120 and a second limb 122 that extends between the axle seat portion 112 and the second end 120. In this example, using suitable fasteners, the second end 120 is coupled to an air spring 24, which is coupled to a second coupling bracket 26 that, in turn is coupled to the frame member 4.

However, the energy storing suspension component 108 does not include a fastener extending from a top or first surface 134. The energy storing suspension component 108 does include spaced apart retention recesses 170 in a bottom or second surface 136. Also, the second example suspension system 102 does not include a liner, and while it includes a spacer 130 that adds a caster angle, the spacer 130 does not have a bore. The spacer 130 includes upstanding locating projections 138 that engage the sides of the axle 6 and assist in retaining the positioning of the suspension components within the axle coupling assembly 110.

The second example also differs in that it includes an additional suspension component, in the form of a trailing arm or beam 178. The trailing arm 178 includes an axle seat portion 180, a first end 182, and a first limb 184 extending between the axle seat portion 180 and the first end 182. The axle seat portion 180 of the trailing arm 178 coincides with the axle seat portion 112 of the energy storing suspension component 108. Further, the trailing arm 178 does not include any retention recesses or protrusions extending from opposed first or second surfaces thereof within the axle seat portion 180.

A shock coupling bracket 140 is provided with upstanding flanges 150 for coupling to a shock absorber 52. The shock absorber mounting bracket 140 also includes protrusions 172 extending from a top or first surface 142 within the region of the axle seat portion 112, but does not include a protrusion extending from the opposed bottom or second surface 144. Also, the second coupling pad 146 does not include a bore or recess, because there is no protrusion to be received by the second coupling pad 146. The only other difference between the first and second examples is that the U-shaped bolts 148 have longer legs to accommodate the taller stack-up that occurs with the inclusion of the trailing arm 178 within the axle coupling assembly 110. With the aforementioned structures in place, the axle coupling assembly 110 and shock coupling bracket 140 help to reduce the likelihood of fracture in the axle seat portion of the energy storing suspension component because there is no aperture therethrough, and it retains the suspension components within the axle coupling assembly during use and in the event of a fracture, while potentially permitting use of lighter weight suspension components.

Turning to FIGS. 3A-3E, a third example suspension system 202 is shown with several suspension components from the first example suspension system 2 and the second example suspension system 102 that are configured and used in a similar way, and which will be similarly numbered and the previous description of the like suspension components will be relied upon for the third example, as well. However, this third example suspension system 202 does differ from the second example in the interface between a shock coupling bracket 240 and an additional suspension component, in the form of a trailing arm 278 that are coupled within an axle coupling assembly 210. The third example uses the spacer 130 and the energy storing suspension component 208 of the second example. The retention recesses 270 in the bottom or second surface 236 of the energy storing suspension component 208 receive protrusions 272 that extend from the top or first surface 242 of the shock coupling bracket 240. The shock coupling bracket 240 also includes a pair of protrusions 274 that extend from its bottom or second surface 244.

The second surface 244 of the shock coupling bracket 240 engages a top or first surface 286 of the additional suspension component, in the form of a trailing arm or beam 278. The trailing arm 278 includes an axle seat portion 280, a first end 282, and a first limb 284 extending between the axle seat portion 280 and the first end 282. The axle seat portion 280 of the trailing arm 278 coincides with the axle seat portion 212 of the energy storing suspension component 208. Further, a top first surface 286 of the trailing arm 278 includes retention recesses 288 that receive the protrusions 274 that extend from the second surface of the shock coupling bracket 240. The recesses 288 are spaced from each other and from a center of the axle seat portion 280. As with the previous examples, the shock coupling bracket 240 has upstanding flanges 250 for coupling to a shock absorber 52. The longer U-shaped bolts 148 accommodate the taller stack-up that occurs with the inclusion of the trailing arm 278 within the axle coupling assembly 210. The lack of apertures through the energy storing suspension component 208 and through the additional suspension component 278 reduces the likelihood of stress concentration and fracture in the respective axle seat portions 212, 280, also potentially permitting thinner, lighter weight suspension components while providing for retention of the limbs 218 and 222 of the energy storing suspension component 208 in the event of a fracture in the center region of the either of the respective axle seat portions 212, 280.

A fourth example suspension system 302 and energy storing suspension component 308 are illustrated in FIGS. 4A-4E. The fourth example includes several suspension components from the first example suspension system 2 that are configured and used in a similar way, and whose previous description of like suspension components will be relied upon for the fourth example, as well. However, this fourth example suspension system 302 does differ from the first example in a few ways. For instance, the energy storing suspension component 308 of the fourth example is somewhat similar to the support member 8 shown in the first example, and includes an axle seat portion 312, and a first end 314 that is formed into a coupling portion to be coupled to the frame member 4 by a first coupling bracket 16 and a suitable bushing and fasteners. The coupling portion in this example similarly is formed into a Berlin eye. A first limb 318 of the energy storing suspension component 308 extends between the axle seat portion 312 and the first end 314. The energy storing suspension component 308 of this fourth example includes a second end 320 and a second limb 322 that extends between the axle seat portion 312 and the second end 320. In this example, using suitable fasteners, the second end 320 is coupled to an air spring 24, which is coupled to a second coupling bracket 26 that, in turn is coupled to the frame member 4.

A shock coupling bracket 340 is provided with upstanding flanges 350 for coupling to a shock absorber 52. In this fourth example, the shock absorber mounting bracket 340 is disposed between the bottom surface of the spacer 30 and a top or first surface 334 of the energy storing suspension component 308. The shock coupling bracket 340 includes protrusions 372 extending from a bottom or second surface 344 within the region of the axle seat portion 312, and a central aperture 390, but does not include a protrusion extending from the opposed top or first surface 342.

The top or first surface 334 of the energy storing suspension component 308 includes spaced apart retention recesses 370 that receive the protrusions 372. Thus, in this example, the other suspension component having the protrusions is the shock coupling bracket 350. In addition, in this example the energy storing suspension component 308 includes an aperture 392 through the center of the axle seat portion 312, which is aligned with an aperture 62 in the spacer 30, as well as the aperture 76 in the second coupling pad 46. A fastener, such as a bolt and nut 394 is disposed in the aligned respective apertures 62, 390, 392, 76, and connects the spacer 30, the shock coupling bracket 340, the energy storing suspension component 308 and the second coupling pad 46, to assist in retaining the relative location of the suspension components. U-shaped bolts 48 are used to clamp together all of the suspension components between the first coupling pad 28 and the second coupling pad 46 within the axle coupling assembly 310.

With the aforementioned structures in place, the axle coupling assembly 310 and shock coupling bracket 340 help to reduce the likelihood of fracture in the axle seat portion 312 of the energy storing suspension component 308 because they complement the retention capacity of the aligned apertures and fastener through the center of the axle seat portion 312. Thus, while the energy storing suspension component 308 includes a central aperture 392, the risk of fracture is reduced by providing the supplemental retention structures. Indeed, the retention features may permit the respective aligned apertures 62, 390, 392, 76 and the fastener 394 to have reduced diameters, to reduce the potential for stress concentration and risk of fracturing the energy storing suspension component 308, while potentially permitting use of lighter weight suspension components. In the event of a fractured energy storing suspension component 308, the protrusions 372 received in the recesses 370 also prevent disengagement of the limbs 318 and 322.

Turning to FIGS. 5A-5E, a fifth example suspension system 402 and energy storing suspension component 408 are illustrated. The fifth example includes several suspension components from the first example suspension system 2 that are configured and used in a similar way, and whose previous description of like suspension components will be relied upon for the fifth example, as well. However, this fifth example suspension system 402 does differ from the first example in several ways. For instance, the energy storing suspension component 408 of the fifth example is somewhat similar to the support member 8 shown in the first example, and includes an axle seat portion 412, and a first end 414 that is formed into a coupling portion to be coupled to the frame member 4 by a first coupling bracket 16 and a suitable bushing and fasteners. The coupling portion in this example similarly is formed into a Berlin eye. A first limb 418 of the energy storing suspension component 408 extends between the axle seat portion 412 and the first end 414. The energy storing suspension component 408 of this fifth example includes a second end 420 and a second limb 422 that extends between the axle seat portion 412 and the second end 420. In this example, using suitable fasteners, the second end 420 is coupled to an air spring 24, which is coupled to a second coupling bracket 26 that, in turn is coupled to the frame member 4.

The fifth example does not include a shock coupling bracket. The energy storing suspension component 408 interacts with adjacent suspension components in the form of a spacer 430 that engages a top or first surface 434 and a second coupling pad 446 that engages a bottom or second surface 436 of the energy storing suspension component 408. The spacer 430 does not include a central aperture but does have a caster angle and includes upstanding locating projections 438 that engage the sides of the axle 6 and assist in retaining the positioning of the suspension components within the axle coupling assembly 410. The second coupling pad 446 also does not include a central aperture.

The energy storing suspension component 408 has retention recesses 470 in the first surface 434, and retention recesses 496 in the second surface 436. In this example, the recesses 470 are spaced apart and generally spaced from a center of the axle seat portion 412, as are the recesses 496. In fact, given the relatively shallow recesses utilized, the recesses 470 and 496 are directly opposed. Thus, the surfaces opposed to the location of the recesses 470, 496 in the energy storing suspension component 408 are flush or recessed, while still avoiding the type of stress concentration that would be present with a central aperture. The recesses 470 receive protrusions 472 that extend from a bottom surface 431 of the spacer 430. Similarly, the recesses 496 receive protrusions 498 that extend from the top surface 499 of the second coupling pad 446.

U-shaped bolts 48 are used to clamp together all of the suspension components between the first coupling pad 28 and the second coupling pad 446 within the axle coupling assembly 410. The avoidance of apertures through the axle coupling assembly 410 and locations of the recesses 470, 496 that are spaced from the center of the axle seat portion 412 help to avoid stress concentrations, to retain the limbs 418 and 422 in the event of a fracture of the energy storing suspension component 408, and may provide advantages of a lighter weight suspension system, as previously discussed.

FIGS. 6A-6E show a sixth example suspension system 502 and energy storing suspension component 508. The sixth example includes several suspension components from the first and fifth example suspension systems 2 and 402 that are configured and used in a similar way, and whose previous description of like suspension components will be relied upon for the sixth example, as well. However, this sixth example suspension system 502 differs from the fifth example in the energy storing suspension component and the second coupling pad. In particular, the energy storing suspension component 508 of the sixth example is somewhat similar to the support member 408 shown in the fifth example, and includes an axle seat portion 512, and a first end 514 that is formed into a coupling portion to be coupled to the frame member 4 by a first coupling bracket 16 and a suitable bushing and fasteners. The coupling portion in this example similarly is formed into a Berlin eye. A first limb 518 of the energy storing suspension component 508 extends between the axle seat portion 512 and the first end 514. The energy storing suspension component 508 of the sixth example includes a second end 520 and a second limb 522 that extends between the axle seat portion 512 and the second end 520. In this example, using suitable fasteners, the second end 520 is coupled to an air spring 24, which is coupled to a second coupling bracket 26 that, in turn is coupled to the frame member 4.

The sixth example does not include a shock coupling bracket. The energy storing suspension component 508 interacts with the adjacent suspension component in the form of the spacer 430 that engages a top or first surface 534 of the energy storing suspension component 508 and a second coupling pad 546 that engages a bottom or second surface 536 of the energy storing suspension component 508. The spacer 430 does not include a central aperture but does have a caster angle and includes upstanding locating projections 438 that engage the sides of the axle 6 and assist in retaining the positioning of the suspension components within the axle coupling assembly 510. The second coupling pad 546 also does not include a central aperture.

The energy storing suspension component 508 has retention recesses 570 in the first surface 534. In this example, the recesses 570 are spaced apart and generally spaced from a center of the axle seat portion 512. The second surface 536 of the energy storing suspension component 508 is opposed to the first surface 534 having the retention recesses 570. Thus, the surface opposed to the location of the recesses 570 in the energy storing suspension component 508 is flush or recessed, while still avoiding the type of stress concentration that would be present with a central aperture. The recesses 570 receive protrusions 472 that extend from a bottom surface 431 of the spacer 430.

U-shaped bolts 48 are used to clamp together all of the suspension components between the first coupling pad 28 and the second coupling pad 546 within the axle coupling assembly 510. The avoidance of apertures through the axle coupling assembly 510 and locations that are spaced from the center of the axle seat portion 512 help to avoid stress concentrations and may provide advantages of a lighter weight suspension system, as previously discussed, while providing for retention of the limbs 518 and 522 of the energy storing suspension component 508 in the event of a fracture.

Turning to FIGS. 7A-7F, a seventh example suspension system 602 is illustrated for coupling a longitudinally extending frame member 4 on one side of a chassis of a wheeled vehicle or trailer to a laterally extending axle 6 that is disposed below the frame member 4. As previously noted, it will be appreciated that the figures show a suspension system for one side of a wheeled vehicle or trailer and a similar system would be provided on the opposite side to form a full suspension system for a vehicle axle. The seventh example suspension system 602 includes an energy storing suspension component 608, which in this seventh example is in a leaf spring member configuration. In the seventh example suspension system 602, the axle 6 is operatively coupled to the energy storing suspension component 608 by an axle coupling assembly 610 that is configured to connect the axle 6 to the energy storing suspension component 608.

In this example, the energy storing suspension component 608 is in an overslung configuration, extending longitudinally above the laterally extending axle 6. The energy storing suspension component 608 of this example includes an axle seat portion 612 of the energy storing suspension component 608 that is generally defined by the region that is clamped within the axle coupling assembly 610. The energy storing suspension component 608 includes a first end 614 that is formed into a coupling portion to be coupled to the frame member 4 by a first coupling bracket 616 and a suitable bushing and fasteners. The coupling portion in this instance is formed into an upturned eye. A first limb 618 of the energy storing suspension component 608 extends between the axle seat portion 612 and the first end 614. The energy storing suspension component 608 of this first example includes a second end 620 and a second limb 622 that extends between the axle seat portion 612 and the second end 620. In this example, using suitable fasteners, the second end 620 is coupled to a second coupling bracket 626, in the form of a shackle bracket, which is coupled to the frame member 4.

From the top of the axle coupling assembly 610 downward, the axle coupling assembly 610 includes a first coupling pad 628, also known as a first coupling pad, guide plate or clamp plate, which in this configuration has a lower surface that engages a top or first surface 634 of the energy storing suspension component 608. A spacer 630 has a top surface that engages the bottom surface 636 of the energy storing suspension component 608, and a bottom surface that engages a top surface of the axle 6. In this example, the spacer 630 does not include a caster or pinion angle. A bottom surface of the axle 6 engages a top surface of the second coupling pad 646.

The first surface 634 of the energy storing suspension component 608 includes retention recesses 670 that receive protrusions 672 that extend from the bottom surface of the first coupling pad 628. An opposed bottom or second surface 636 of the energy storing suspension component 608 includes retention recesses 696 that receive protrusions 698 that extend from the top surface of the spacer 630. In this example, the second coupling pad 646 has four apertures therethrough and the legs of a pair of U-shaped bolts 648 pass through the respective apertures to permit the U-shaped bolts 648 to clamp together the aforementioned suspension components of the axle coupling assembly 610 between the first and second coupling pads 628, 646, respectively, to couple the axle 6 to the energy storing suspension component 608.

The lack of an aperture through the first coupling pad 628, the energy storing suspension component 608, the spacer 630 and second coupling pad 646 reduces the stress concentration within the center of the axle seat portion 612 of the energy storing suspension component 608. As noted above, this reduces the likelihood of an energy storing suspension component fracture, and therefore, may permit the energy storing suspension component 608 to be made somewhat thinner through the axle seat portion 612, saving weight.

Importantly, the recesses 670 are spaced apart from each other and from the center of the axle seat portion 612 and are located in relatively lower stress regions of the energy storing suspension component 608. As shown in the cross-section C-C in FIG. 7E, the recesses 670 are centrally located laterally in the energy storing suspension component 608, although it will be appreciated that other positioning may be utilized. As may be seen in FIG. 7C, the recesses 696 also are spaced apart from each other and from the center of the axle seat portion 612, but are disposed between the other recesses 670. As shown in the cross-section D-D in FIG. 7F, the recesses 696 also are centrally located laterally in the energy storing suspension component 608, although again, other positioning may be utilized.

In the seventh example, as in the previous examples, the recesses 670, 696 are relatively shallow, and will depend on the thickness and material used in the energy storing suspension component 608. The depth may be, for instance, around one quarter inch, but the recesses 670, 696 do not extend through the energy storing suspension component 608. Accordingly, the second surface 636 of the energy storing suspension component 608 that is opposed to the location of the recesses 670 in the first surface 634 is flush with the surrounding portion of the opposed second surface 636. Similarly, the first surface 634 of the energy storing suspension component 608 that is opposed to the location of the recesses 696 in the second surface 636 is flush with the surrounding portion of the opposed first surface 634. Thus, the opposed surfaces are flush or may even include recesses, while including significant material thickness around the recesses 670, 696 in the axle seat portion 612. This also helps to avoid fractures of the energy storing suspension component 608 in the axle seat portion 612.

As noted with the previous examples, with the protrusions 672 received in the retention recesses 670 and the protrusions 698 received in the retention recesses 696, if the energy storing suspension component 608 is fractured, its limbs 618, 622 will be retained within the axle coupling assembly 610. Retaining the first and second limbs 618, 622 within the axle coupling assembly 610 is important to the ability to maintain the clamp load within the axle coupling assembly 610 and to avoid disengagement of a limb, and the previously discussed problems associated therewith. The configuration also reduces the clamp load required to keep the suspension components from shifting laterally or longitudinally, which also may permit use of smaller diameter U-shaped bolts 648, enabling still further weight reduction.

Turning to FIGS. 8A-8E, an eighth example suspension system 702 is illustrated for coupling a longitudinally extending frame member 4 on one side of a chassis of a wheeled vehicle or trailer to a laterally extending axle 6 that is disposed below the frame member 4. As with the other drawings of this disclosure, it will be appreciated that the figures show a suspension system for one side of a wheeled vehicle or trailer and a similar system would be provided on the opposite side to form a full suspension system for a vehicle axle. The eighth example suspension system 702 includes an energy storing suspension component 708, which in this example is in a support member configuration. In the example suspension system 702, the axle 6 is operatively coupled to the energy storing suspension component 708 by an axle coupling assembly 710 that is configured to connect the axle 6 to the energy storing suspension component 708.

In this example, the energy storing suspension component 708 is in an underslung configuration, extending longitudinally below the laterally extending axle 6. The energy storing suspension component 708 of this example includes an axle seat portion 712 of the energy storing suspension component 708 that is generally defined by the region that is clamped within the axle coupling assembly 710. The energy storing suspension component 708 includes a first end 714 that is formed into a coupling portion to be coupled to the frame member 4 by a first coupling bracket 716 and a suitable bushing and fasteners. The coupling portion in this instance is formed into a Berlin eye. A first limb 718 of the energy storing suspension component 708 extends between the axle seat portion 712 and the first end 714. The energy storing suspension component 708 of this first example includes a second end 720 and a second limb 722 that extends between the axle seat portion 712 and the second end 720. In this example, using suitable fasteners, the second end 720 is coupled to an air spring 24, which is coupled to a second coupling bracket 26 that, in turn is coupled to the frame member 4.

From the top of the axle coupling assembly 710 downward, the axle coupling assembly 710 includes a first coupling pad 728, also known as a first mounting pad, guide plate or clamp plate, which in this configuration engages a top surface of the axle 6. A spacer 730 has a top surface that engages the bottom surface of the axle 6, and a bottom surface that engages a top surface 734 of the energy storing suspension component 708. In this example, the spacer 730 includes a caster or pinion angle, as well as a shock mounting flange 740. A bottom surface 736 of the energy storing suspension component 708 engages an optional liner 732, which preferably is constructed of galvanized sheet metal, rubber or other suitable materials. A bottom surface of the liner 732 engages a top or first surface 786 of an additional suspension component 778, in the form of a trailing arm or beam. The trailing arm 778 includes an axle seat portion 780, a first end 782, and a first limb 784 extending between the axle seat portion 780 and the first end 782. The axle seat portion 780 of the trailing arm 778 coincides with the axle seat portion 712 of the energy storing suspension component 708.

The top or first surface 734 of the energy storing suspension component 708 includes a pair of spaced apart retention recesses 770, that also are spaced from a center of the axle seat portion 712. Received in the recesses 770 are protrusions 772 that extend from a bottom surface 744 of the spacer 730. The opposed bottom or second surface 736 of the energy storing suspension component 736 is flush with the surface around it or may even be recessed, if desired, due to the shallow depth of the recesses 770.

The spacer 730 also includes upstanding locating projections 738 that engage the sides of the axle 6 and assist in retaining the positioning of the suspension components within the axle coupling assembly 710. The shock mounting flange 740 that extends from the spacer 730 is provided for coupling to a dampener, such as a shock absorber 52 that may be coupled to the frame member 4 at its upper end at a shock coupling bracket 54.

As with some of the previous examples, longer U-shaped bolts 748 accommodate the taller stack-up that occurs with the inclusion of the trailing arm 778 within the axle coupling assembly 710. In this eighth example, the lack of apertures through the energy storing suspension component 708 and through the additional suspension components, the spacer 730 and trailing arm 778, reduces the likelihood of stress concentration and fracture in the respective axle seat portions 712, 780, also potentially permitting thinner, lighter weight suspension components, while providing for retention of the limbs 718 and 722 of the energy storing suspension component 708 in the event of a fracture.

It will be appreciated that, in accordance with the present disclosure, energy storing suspension components and suspension systems that utilize such suspension components may be provided in various configurations. Any variety of suitable materials of construction, configurations, shapes and sizes for the suspension components and methods of operatively coupling or connecting the suspension components may be utilized to meet the particular needs and requirements of an end user. It will be apparent to those skilled in the art that various modifications can be made in the design and construction of such suspension components and systems without departing from the scope of the attached claims, and that the claims are not limited to the preferred embodiments illustrated.

The invention claimed is:

1. An energy storing suspension component comprising:
   an axle seat portion, the energy storing suspension component further comprising a first end and a first limb extending between the axle seat portion and the first end;
   the axle seat portion including opposed first and second surfaces with at least one of the first and second surfaces having at least two recesses spaced apart longitudinally along the energy storing suspension component with each being spaced from a center of the axle seat portion;
   the at least two recesses being configured to receive respective protrusions extending from at least one suspension component that is connected to the energy storing suspension component when coupled within an axle coupling assembly;
   the surface of the axle seat portion that is opposed to the location of the at least two recesses being flush with or recessed relative to a surrounding portion of the opposed surface;
   the energy storing suspension component further comprising an aperture through the axle seat portion that is located between the at least two recesses and that receives a fastener, and
   wherein the fastener engages the at least one suspension component that is connected to the energy storing suspension component by the axle coupling assembly.

2. The energy storing suspension component of claim 1 wherein the first end of the energy storing suspension component is formed into a coupling portion.

3. The energy storing suspension component of claim 2 wherein the coupling portion is formed in the shape of an eye.

4. The energy storing suspension component of claim 1 wherein the fastener is connected to the at least one suspension component that is connected to the energy storing suspension component when coupled within an axle coupling assembly.

5. The energy storing suspension component of claim 4 wherein the fastener is connected to a shock coupling bracket.

6. The energy storing suspension component of claim 1 wherein the at least one suspension component engaged by the fastener is a spacer, a coupling pad, or a caster or pinion wedge.

7. The energy storing suspension component of claim 1 wherein the fastener further comprises a bolt.

8. A suspension system comprising:
   an axle coupling assembly further comprising a first coupling pad and a second coupling pad;
   an energy storing suspension component having an axle seat portion, the energy storing suspension component further comprising a first end and a first limb extending between the axle seat portion and the first end;
   the energy storing suspension component being disposed between the first and second coupling pads of the axle coupling assembly;
   the axle seat portion of the energy storing suspension component including opposed first and second surfaces with at least one of the first and second surfaces having at least two recesses that are spaced longitudinally from a center of the axle seat portion;
   the at least two recesses being configured to receive respective protrusions extending from at least one suspension component within the suspension system that is connected to the energy storing suspension component by the axle coupling assembly wherein the at least one suspension component having the protrusions is a spacer, a caster, a pinion wedge, a shock bracket or one of the first or second coupling pads;

the surface of the axle seat portion that is opposed to the location of the at least two recesses being flush with or recessed relative to a respective surrounding portion of the opposed surface; and the energy storing suspension component further comprising an aperture through the axle seat portion that receives a fastener that also is received within an aperture through at least the first or second coupling pad.

9. The suspension system of claim 8 wherein the protrusions received by the at least two recesses extend from a suspension component above or below the axle seat portion of the energy storing suspension component.

10. The suspension system of claim 8 wherein the protrusions received by the at least two recesses extend from a bracket.

11. The suspension system of claim 10 wherein the bracket is a shock coupling bracket.

12. An energy storing suspension component comprising:

an axle seat portion, the energy storing suspension component further comprising a first end and a first limb extending between the axle seat portion and the first end;

the axle seat portion including opposed first and second surfaces with at least one of the first and second surfaces having at least two recesses spaced apart longitudinally along the energy storing suspension component with each being spaced from a center of the axle seat portion;

the at least two recesses being configured to receive respective protrusions extending from at least one suspension component that is connected to the energy storing suspension component when coupled within an axle coupling assembly;

the surface of the axle seat portion that is opposed to the location of the at least two recesses being flush with or recessed relative to a surrounding portion of the opposed surface;

the energy storing suspension component further comprising an aperture through the axle seat portion that is located between the at least two recesses and that receives a fastener, and wherein the fastener engages at least a second suspension component that also engages and aligns an axle with the energy storing suspension component when coupled within the axle coupling assembly.

13. The energy storing suspension component of claim 12 wherein the first end of the energy storing suspension component is formed into a coupling portion.

14. The energy storing suspension component of claim 13 wherein the coupling portion is formed in the shape of an eye.

15. The energy storing suspension component of claim 12 wherein the fastener is connected to the at least one suspension component that is connected to the energy storing suspension component when coupled within an axle coupling assembly.

16. The energy storing suspension component of claim 15 wherein the fastener is connected to a shock coupling bracket.

17. The energy storing suspension component of claim 12 wherein the at least one suspension component engaged by the fastener is a spacer, a coupling pad, or a caster or pinion wedge.

18. The energy storing suspension component of claim 12 wherein the fastener further comprises a bolt.

* * * * *